United States Patent
Saito et al.

(10) Patent No.: US 8,935,636 B2
(45) Date of Patent: Jan. 13, 2015

(54) INFORMATION PROCESSING APPARATUS, INFORMATION PROCESSING METHOD AND INFORMATION PROCESSING PROGRAM FOR PERFORMING A TRACING OPERATION

(75) Inventors: Toshiki Saito, Tokyo (JP); Ryoko Shimokawa, Tokyo (JP); Shinya Miyoshi, Tokyo (JP); Mitsuo Okumura, Tokyo (JP)

(73) Assignee: Sony Corporation, Tokyo (JP)

( * ) Notice: Subject to any disclaimer, the term of this patent is extended or adjusted under 35 U.S.C. 154(b) by 1034 days.

(21) Appl. No.: 12/991,130

(22) PCT Filed: Mar. 1, 2010

(86) PCT No.: PCT/JP2010/053701
§ 371 (c)(1),
(2), (4) Date: Nov. 5, 2010

(87) PCT Pub. No.: WO2010/113597
PCT Pub. Date: Oct. 7, 2010

(65) Prior Publication Data
US 2011/0055775 A1 Mar. 3, 2011

(30) Foreign Application Priority Data
Mar. 31, 2009 (JP) ................. 2009-084105

(51) Int. Cl.
*G06F 3/033* (2013.01)
*G06F 3/0485* (2013.01)
*G06F 3/0488* (2013.01)

(52) U.S. Cl.
CPC .......... *G06F 3/0485* (2013.01); *G06F 3/04883* (2013.01)
USPC .......................................... 715/863

(58) Field of Classification Search
CPC ...................................... G06F 3/0485
USPC ........................................... 715/863
See application file for complete search history.

(56) References Cited

U.S. PATENT DOCUMENTS 5,550,969 A * 8/1996 Torres et al. .................. 715/787
5,726,687 A * 3/1998 Belfiore et al. ............... 715/785

(Continued)

FOREIGN PATENT DOCUMENTS

JP 7 175587 7/1995
JP 2004 343662 12/2004

(Continued)

OTHER PUBLICATIONS

International Search Report issued Apr. 13, 2010 in PCT/JP10/053701 filed Mar. 1, 2010.

*Primary Examiner* — William Bashore
*Assistant Examiner* — Henry Orr
(74) *Attorney, Agent, or Firm* — Oblon, Spivak, McClelland, Maier & Neustadt, L.L.P.

(57) ABSTRACT

To present the operating state of a tracing operation in the event of performing a tracing operation to scroll objects of display. Upon a tracing operation being performed as to the operating face of an input detection device (i) provided on the display face of a display device (5), coordinate information indicating he instructed position corresponding to the tracing operations is output from the input detection device (I). A user interface control unit (2) detects the operation direction and amount-of-operation with the starting position of the tracing operation as a reference, based on the coordinate information from the input detection device (i), and effects control so as to change the display mode of operating symbols displayed on the display screen of the display device (5).

15 Claims, 19 Drawing Sheets

(56) References Cited

U.S. PATENT DOCUMENTS

| | | | |
|---|---|---|---|
| 5,732,227 A | | 3/1998 | Kuzunuki et al. |
| 5,917,490 A | | 6/1999 | Kuzunuki et al. |
| 6,157,381 A | * | 12/2000 | Bates et al. .................. 715/786 |
| 6,266,057 B1 | | 7/2001 | Kuzunuki et al. |
| 7,278,111 B2 | * | 10/2007 | Stata et al. .................. 715/771 |
| 7,689,928 B1 | * | 3/2010 | Gilra ............................ 715/787 |
| 2002/0126161 A1 | | 9/2002 | Kuzunuki et al. |
| 2002/0186252 A1 | * | 12/2002 | Himmel et al. ............... 345/787 |
| 2006/0022961 A1 | | 2/2006 | Kaminaga et al. |
| 2006/0129933 A1 | * | 6/2006 | Land et al. .................... 715/723 |
| 2006/0238625 A1 | | 10/2006 | Sasaki et al. |
| 2007/0143705 A1 | * | 6/2007 | Peters ........................... 715/786 |
| 2007/0294643 A1 | * | 12/2007 | Kyle ............................. 715/855 |
| 2007/0300180 A1 | * | 12/2007 | Hama et al. ................... 715/787 |
| 2008/0034316 A1 | * | 2/2008 | Thoresson .................... 715/781 |
| 2008/0042978 A1 | * | 2/2008 | Perez-Noguera ............. 345/168 |
| 2010/0005417 A1 | * | 1/2010 | Lanahan et al. .............. 715/815 |
| 2010/0134416 A1 | * | 6/2010 | Karasin et al. ................ 345/163 |

FOREIGN PATENT DOCUMENTS

| | | |
|---|---|---|
| JP | 2006 040050 | 2/2006 |
| WO | 2007 086386 | 8/2007 |

* cited by examiner

SCROLLING SPEED V AT POINT-IN-TIME t

V = ((TARGET POSITION AT POINT-IN-TIME t) −
(DISPLAY POSITION AT POINT-IN-TIME t)) × COEFFICIENT   ⋯ (1)

SCROLLING SPEED V1 AT POINT-IN-TIME t − 1

V = ((TARGET POSITION AT POINT-IN-TIME t − 1) −
(DISPLAY POSITION AT POINT-IN-TIME t−1)) × COEFFICIENT   ⋯ (2)

DISPLAY POSITION X AT POINT-IN-TIME t

X = V1 + (DISPLAY POSITION AT POINT-IN-TIME t − 1)   ⋯ (3)

FIG. 25

| DRAGGING START REGION | DRAGGING OPERATION DIRECTION | AMOUNT-OF-OPERATION (RATIO) | HEAD SYMBOL POSITION | SYMBOL INTERVAL SECTIONS | SYMBOL INTERVAL 1 | SYMBOL INTERVAL 2 | SYMBOL INTERVAL 3 |
|---|---|---|---|---|---|---|---|
| A, B, D | UPPER SIDE | $\leq \times 1$ | 103A_y1 | NON-UNIFORM | 4 | 8 | 12 |
| | | $\leq \times 2$ | 103A_y2 | NON-UNIFORM | 3 | 6 | 9 |
| | | $\leq \times 3$ | 103A_y3 | NON-UNIFORM | 2 | 4 | 6 |
| | | $\leq \times 4$ | 103A_y4 | NON-UNIFORM | 1 | 2 | 3 |
| | | ... | ... | ... | ... | ... | ... |
| A, C, E | LOWER SIDE | $\leq \times 1$ | 103D_yy1 | NON-UNIFORM | 4 | 8 | 12 |
| | | $\leq \times 2$ | 103D_yy2 | NON-UNIFORM | 3 | 6 | 9 |
| | | $\leq \times 3$ | 103D_yy3 | NON-UNIFORM | 2 | 4 | 6 |
| | | $\leq \times 4$ | 103D_yy4 | NON-UNIFORM | 1 | 2 | 3 |
| | | ... | ... | ... | ... | ... | ... |
| B | LOWER SIDE | $\leq \times 1$ | 103D_yy1 | UNIFORM | 10 | 10 | 10 |
| | | $\leq \times 2$ | 103D_yy2 | UNIFORM | 9 | 9 | 9 |
| | | ... | ... | ... | ... | ... | ... |
| | | $\leq \times n$ | 103D_yyn | UNIFORM | 0 | 0 | 0 |
| C | UPPER SIDE | $\leq \times 1$ | 103A_y1 | UNIFORM | 10 | 10 | 10 |
| | | $\leq \times 2$ | 103A_y2 | UNIFORM | 9 | 9 | 9 |
| | | ... | ... | ... | ... | ... | ... |
| | | $\leq \times n$ | 103A_yn | UNIFORM | 0 | 0 | 0 |

FIG. 26

| DRAGGING START REGION | DRAGGING OPERATION DIRECTION | AMOUNT-OF-OPERATION (RATIO) | HEAD SYMBOL POSITION | SYMBOL INTERVAL SECTIONS | SYMBOL INTERVAL 1 | SYMBOL INTERVAL 2 | SYMBOL INTERVAL 3 |
|---|---|---|---|---|---|---|---|
| D | LOWER SIDE | ≤ × 1 | 103D  yy1 | UNIFORM + | 6 | 6 | 9 |
|   |   | ≤ × 2 | 103D  yy2 | UNIFORM + | 4 | 4 | 6 |
|   |   | ≤ × 3 | 103D  yy3 | UNIFORM + | 2 | 2 | 3 |
|   |   | ≤ × 4 | 103D  yy4 | UNIFORM + | 1 | 1 | 2 |
|   |   | ‥ | ‥ | ‥ | ‥ | ‥ | ‥ |
| E | UPPER SIDE | ≤ × 1 | 103A  y1 | UNIFORM + | 6 | 6 | 9 |
|   |   | ≤ × 2 | 103A  y2 | UNIFORM + | 4 | 4 | 6 |
|   |   | ≤ × 3 | 103A  y3 | UNIFORM + | 2 | 2 | 4 |
|   |   | ≤ × 4 | 103A  y4 | UNIFORM + | 1 | 1 | 2 |
|   |   | ‥ | ‥ | ‥ | ‥ | ‥ | ‥ |

INFORMATION PROCESSING APPARATUS, INFORMATION PROCESSING METHOD AND INFORMATION PROCESSING PROGRAM FOR PERFORMING A TRACING OPERATION

TECHNICAL FIELD

The present invention relates to a device including, for example, a display device such as an LCD (Liquid Crystal Display) or the like, and an input detection device such as a touch panel provided on the display screen of the display device, which is capable of receiving operation input from a user, and changing the display displayed on the display screen of the display device in accordance with the operation input, and to a method and a program.

BACKGROUND ART

For example, various types of information processing devices configured of a display devices such as an LCD having a relatively large display screen and a touch panel provided on the display screen of the display device, and having an operation unit for accepting operation input from a user (user) have been provided.

For example, by touching a finger or the like at a position on the operating face of the touch panel corresponding to a display position of an intended icon displayed on the display screen allows the fact that the icon displayed at the position corresponding to the touched position has been selected to be recognized.

Variously changing the display, such as icons to be displayed on the display screen, enables input of a wide variety of information, whereby an input unit (input means), with better operability as compared to a case of directly operating so-called hardware keys directly provided to the device, can be realized.

There are various of information processing devices to which such input units have been provided, such as cellular telephone terminals, portable music players, portable information terminals called PDAs (Personal Digital Assistant) and the like, for example.

Now, PTL 1 discloses an invention relating to an imaging apparatus which is a device having an operating unit made up of a display device and touch panel, and is arranged so as to have improved operability and visual recognition in cases of setting functions and making adjustments.

PATENT LITERATURE

PTL 1: Japanese Unexamined Patent Application Publication No. 2004-343662

SUMMARY OF INVENTION

Now, in the case of an input unit made up of a display device and touch panel, not only can touch operations (tapping operations) simply be accepted, but also operations which trace the operating face of the touch panel, such as dragging operations and flicking operations can be accepted.

Such tracing operations allow, for example, display items to be scrolled and displayed, or page breaks to be speedily made.

Also, in the case of scrolling display items in accordance with dragging operations for example, the speed of scrolling can be controlled in accordance with the amount-of-operation of the dragging operation.

In conventional cases, the user can be notified by displaying a scroll bar for example, regarding at what position in the display item group to be displayed the display items currently displayed are situated.

However, the user cannot intuitively know what the scrolling speed of the current display items is in accordance to the state of dragging operations made by the user, e.g., in accordance to the amount-of-operation of a dragging operation.

Accordingly, it can be conceived that the user only can judge whether the scrolling speed is fast or slow by watching the display items of which a scrolling display actually is being made, making for cases in which adjustment of the degree of scrolling to the intended display item is difficult.

In light of the above, it is an object of the present invention to present the operating state of a tracing operation in the case of performing a tracing operation such as a dragging operation to scroll an object of display, thereby facilitating adjustment of the degree of scrolling.

In order to solve the above problems, an information processing device according to Claim 1 of the invention includes:
a display device;
instruction position detecting means with an operating face provided on the display screen of the display device, for accepting an instruction operation from a user and detecting and outputting coordinate information indicating an instructed position corresponding to the instruction operation;
detecting means for detecting, in the event that a tracing operation has been performed as to the operating face of the instruction position detecting means, amount-of-operation and operation direction with a starting position of the tracing operation as a reference, based on the coordinate information from the instruction position detecting means; and
operating symbol display control means for displaying operating symbols at predetermined positions of the display screen of the display device so as to change in accordance with tracing operations of a user, and also for changing the display mode of the operating symbols such that tracing operations of the user are recognizable, based on detection output from the detecting means.

With the information processing device according to the present invention as described in this Claim 1, an operating face of instruction position detecting means for accepting operation instructions from a user is provided on the display screen of a display device. Upon the user performing a tracing operation on the operating face of the instruction position detecting means, coordinate information indicating the instruction position corresponding to the tracing operation is detected by the instruction position detecting means.

The detecting means detect amount-of-operation and operation direction with the starting position of the tracing operation as a reference, based on the coordinate information from the instruction position detecting means. Before accepting the tracing operation from the user, the operating symbol display control means display operating symbols at predetermined positions of the display screen of the display device.

Then, upon accepting tracing operations from the user, the operating symbol display control means change the display mode of the operating symbols displayed on the display screen of the display device, based on detection output from the detecting means.

Accordingly, the state of tracing operations from the user can be notified to the user in accordance with the display mode of operating symbols. The way in which instruction operations are made can be adjusted in accordance with the display mode of the operating symbols, so as to be suitably and speedily led to the intended display item.

According to the present embodiment, in the case of performing a tracing operation such as a dragging operation and scrolling objects of display, the operating state of the tracing operation can be presented to the user, thereby facilitating adjustment of the degree of scrolling.

BRIEF DESCRIPTION OF DRAWINGS

FIG. 25 is a diagram for describing a correlation table correlating how intervals between boundary symbols are to be controlled.

FIG. 26 is a diagram for describing a correlation table correlating how intervals between boundary symbols are to be controlled.

DESCRIPTION OF EMBODIMENTS

An embodiment of the device, method, and program according to the present invention will be described below, with reference to the drawings. In the embodiment described below, first, a case will be described in which the present invention is applied to an information processing device having an input unit configured of a display device (display device) and input detection device (input detection device (instructed position detecting means)). Subsequently, a case of applying the present invention to an imaging apparatus will be described as a more specific example.

[Configuration Example of Information Processing Device]

Figure 1:
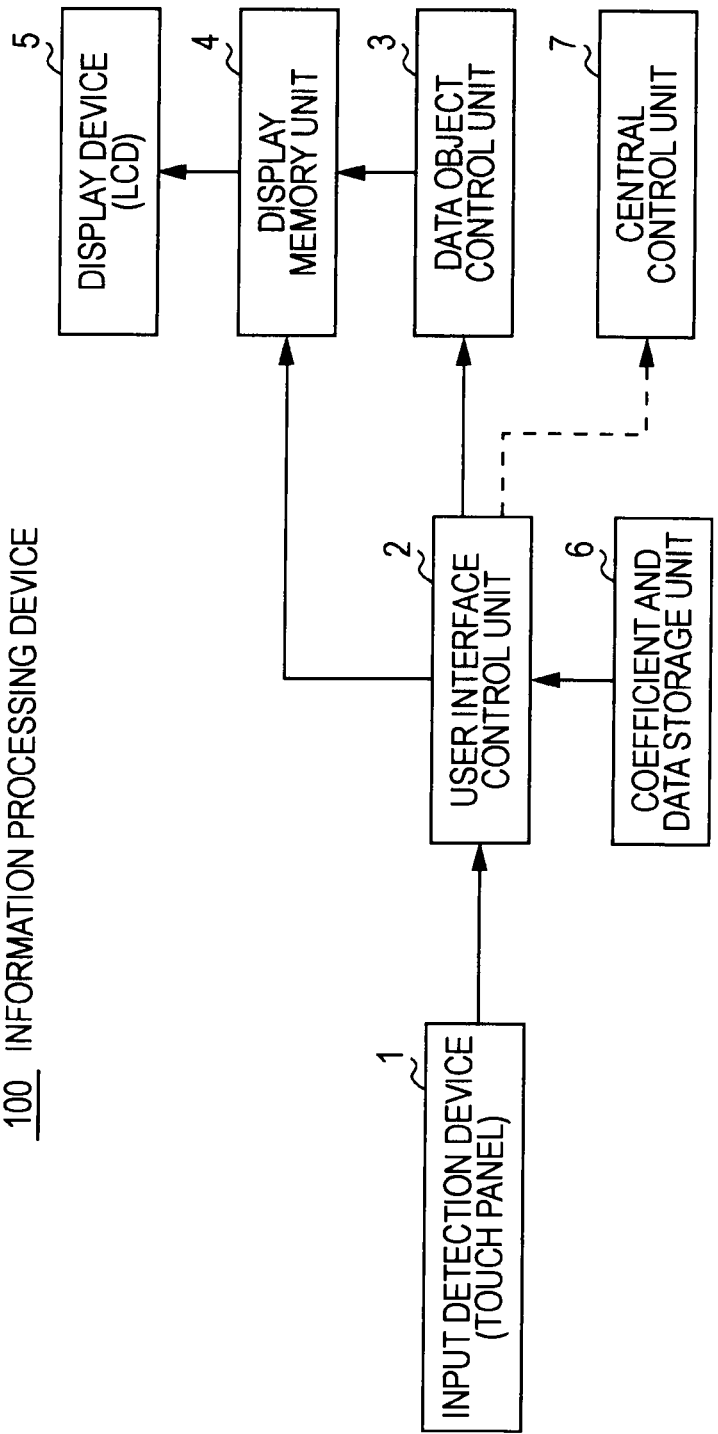
FIG. 1 is a block diagram illustrating a configuration example of an information processing device 100 to which an embodiment of the present invention has been applied.

FIG. 1 is a block diagram for describing a configuration example of an information processing device 100 according to the present embodiment, which is an information processing device to which an embodiment of the present invention has been applied.

As shown in FIG. 1, the information processing device 100 includes an input detection device 1, a user interface control unit 2, a data object control unit 3, a display memory unit 4, a display device 5, a coefficient and data storage unit 6, and a central control unit 7.

The input detection device 1 has a configuration of a pressure-sensitive or electrostatic touch panel. The input detection device 1 accepts instruction operations (touch operations) as to the operating face of the input detection device 1 from the user (user), detects the instruction position (touching position) on the operating face, and outputs coordinate data (coordinate information) indicating the instruction position.

The display device 5 includes a so-called thin-type display device such as, for example, an LCD or organic EL panel (Organic Electroluminescence Panel) or the like, and a controller or the like for performing display control as to the display device.

The input detection device 1 is provided by application by adhesion, for example, to the entire face of the display device of the display device 5. That is to say, the operating face of the input detection device 1 matches the display screen of the display device of the display device 5.

Accordingly, the coordinates of the display screen of the display device 5 and the coordinates on the operating face of the input detection device 1 match. Let us say that the user then touches a position on the operating face of the input detection device 1 with a finger or stylus or the like.

In this case, an arrangement is made so that in the event that a numeral is displayed at the position on the display screen corresponding to (matching) the touching position, determination can be made that at the control unit of the device, for example, that the user has selected the displayed numeral so as to input.

Thus, with the information processing device 100, the input detection device 1 and display device 5 make up an input unit (input means for accepting instruction operations (instruction input) from the user.

The user interface control unit 2, data object control unit 3, and central control unit 7, are realized by a single microcomputer, for example. Of course, each of these control units may be realized by separate microcomputers.

Note that a microcomputer is configured of a CPU (Central Processing Unit), ROM (Read Only Memory), RAM (Random Access Memory, EEPROM (Electrically Erasable and Programmable ROM), and so forth, being connected via a CPU bus.

Here, the CPU reads out an executes a program stored and held in later-described ROM, thereby executing the object processing. More specifically, the CPU executes a program stored and held in ROM, and performs processing such as performing various types of computation and notifying the results to the various parts, performing computation using data supplied from the various parts and recording the results in memory, and so forth.

The ROM has recorded therein beforehand various types of data necessary for the program and processing to be executed by the CPU as described above. The RAM is used primarily as a work region such as temporarily storing partway results in the various types of processing.

The EEPROM is so-called non-volatile memory, and is for storing and holding information which needs to be held even when the power of the information processing device 100 is turned off, such as various types of setting parameters and programs for adding functions, and so forth, for example.

Also, the display memory unit 4 is display-dedicated memory configured using RAM, for example. Also, the coefficient and data storage unit 6 is configured using non-volatile memory such as ROM or EEPROM, and is for storing and holding various types of coefficients and data used by the user interface control unit 2.

Also, the central control unit 7 is for controlling each of the parts in accordance with user input operations performed as to the input face of the input detection device 1, so as to perform processing according to user instructions.

Now, with the information processing device 100 according to the present embodiment, the input detection device 1 is capable of detecting operations made by touching a finger or stylus or the like on the operation face of the input detection device 1. The input detection device 1 further can output coordinate data indicating the touched position.

Also, the input detection device 1 can detect each of operations performed at the same time by touching multiple places on the operating face of the input detection device 1 with fingers or styluses or the like. The input detection device 1 moreover can output coordinate data for each of the touched positions.

Also, the input detection device 1 can detect each of operations performed at the same time by touching the operating face thereof repeatedly, and output coordinate data for each of the touched positions.

Further, the input detection device 1 can continuously detect touched position while the operating face of the input detection device 1 is being touched by a finger or stylus, every predetermining timing, and output coordinate data indicating this.

Accordingly, the input detection device 1 can accept various instruction operations (operation input) from the user, such as so-called tapping operations, double-tapping operations, dragging operations, flicking operations, pinching operations, and so forth, and output coordinates information corresponding thereto.

Here, a tapping operation is a motion (operation) to instruct on the operating face of the input detection device 1 just once by the user's finger or a stylus, such as a "tap". The double tapping operation is a motion to instruct on the operating face of the input detection device 1 consecutively twice, such as "tap, tap".

Also, a dragging operation is a motion to move the user's finger or stylus while contacting the operating face of the input detection device 1. A flicking operation is a motion to instruct one point on the operating face of the input detection device 1 with the user's finger or stylus, and then to operate so as to quickly "flick" this in an intended direction.

A pinching operation is an operation to simultaneously bring two of the user's fingers into contact with the operating face of the input detection device 1 and to open or close the two fingers. In this case, particularly, an operation to open the two fingers or the like in contact will be referred to as a pinch out operation, and an operation to close the two fingers or the like will be referred to a pinch in operation.

Though the dragging operation and the flicking operation differ in operation speed, the dragging operation and the flicking operation are operations to bring the user's finger or the like into contact with the operating face and then to move over the operating surface (tracing operation over the operating surface), and are operations which can be recognized with two types of information, which are movement distance and movement direction.

Accordingly, dragging operations and flicking operations are sometimes called "tracing operations" or gestures". With the present specification as well, the term tracing operation is used as a general term for the dragging operation and the flicking operation.

With the information processing device 100 according to the present embodiment, the display screen of the display device of the display device 5 is generally divided into two regions, which will be described later in detail. One is a user interface region for accepting tracing operations from the user. The other one is an item etc. display selection region for displaying an image region or the like corresponding to item groups or playable contents corresponding to executable functions, and enabling selection thereof.

Primarily, tracing operations are performed as to the operating face of the input detection device 1 at the user interface region. Here, a case of performing a dragging operation for the tracing operation will be described as an example, to facilitate description.

Upon a dragging operation being performed as to the operating face of the input detection device 1 at the user interface region, coordinate information (coordinate data) corresponding to the dragging position on the operating face of the input detection device 1 is detected every predetermined timing. The detected coordinate data then is sequentially notified to the user interface control unit 2.

Accordingly, the user interface control unit 2 can accurately comprehend how the contact position of the user fingers or the like has changed in the period from starting of the dragging operation to ending thereof, based on the coordinate data from the input detection device 1.

The user interface control unit 2 then recognizes the position indicated by the coordinates first notified after the dragging operation has started as the starting point (starting position) of the dragging operation. Subsequently, the user interface control unit 2 recognizes the position indicated by the latest notified coordinate data as the current dragging position.

The user interface control unit 2 then obtains the difference between the starting point of the dragging operation and the current dragging position. Further, the user interface control unit 2 obtains the ratio of the obtained difference as to the maximum draggable amount in the user interface region (amount-of-operation). Also, the user interface control unit 2 comprehends in which direction the current dragging position is, with the starting point of the dragging operation as a reference.

Accordingly, the user interface control unit 2 can comprehend what sort of dragging operation is currently being performed, with the starting point as a reference, in accordance with the ratio (amount-of-operation) that has been obtained, and the direction from the starting point of the current dragging position.

The user interface control unit 2 calculates the display position of a boundary symbol, which is display information in the user interface region stored and held in the display memory unit 4, in accordance with the ratio that has been obtained, and the direction (operation direction) toward the current dragging position with the starting point of the dragging operation as a reference.

Note that as described above, the ratio indicating the amount-of-operation of the dragging operation is calculated using the difference between the starting point of the dragging operation and the current dragging position. Accordingly, by enabling the difference to be represented using the signs of plus (+) and minus (−), the absolute value of the ratio indicates the amount-of-operation of the dragging operation, and the sign of the ratio indicates the direction of the current dragging position with the starting point of the dragging operation as a reference.

The user interface control unit 2 then effects control so as to change the display position of the boundary symbol displayed on the user interface region stored and held in the display memory unit 4, in accordance with the current amount-of-operation (difference) that has been calculated, and the direction of the current dragging position.

Now, the boundary symbol is subject to cases of changing the display mode thereof in accordance with user dragging operations. Thus, the boundary symbol changes the display mode thereof in accordance with user dragging operations, and thus can also be called an operating symbol.

At the same time, the user interface control unit 2 obtains acceleration for scrolling item information (data objects) displayed in the item etc. display selection region, using the obtained ratio and coefficient data stored and held in the coefficient and data storage unit 6. The obtained acceleration and the direction of the current dragging position are notified to the data object control unit 3.

The data object control unit 3 controls the item information of the display memory unit 4 and the display position thereof, so as to scroll the item information displayed in the item etc. display selection region based on in the acceleration from the user interface control unit 2 and the direction of the current dragging position.

Subsequently, the display device 5 changes the display of the user interface unit and the item etc. display selection region provided to the display screen of the display device, based on the display information arranged in the display memory unit 4.

Accordingly, the display mode of the boundary symbol displayed on the user interface region can be changed, in accordance with the operation state of dragging operations performed as to the operating face of the input detecting device in the user interface region provided on the display screen.

Also, the item display displayed in the item etc. display selection region can be scrolled in accordance with the operation state of dragging operations performed as to the operating face of the input detecting device in the user interface region provided on the display screen.

Upon the intended item display being displayed on the item etc. display selection region, the user performs a tapping operation in which the finger or the like is brought into contact with the operating face of the input detection device 1, on the intended item display in the item etc. display selection region.

In this case, coordinate data indicating the position of the tapping operation is output from the input detection device 1, and is supplied to the user interface control unit 2. In the event that the coordinate data from the input detection device 1 is for the item etc. display selection region, the user interface control unit 2 notifies this coordinate data to the central control unit 7.

The central control unit 7 determines what the display item displayed at the position on the display screen indicated by the notified coordinate data is. The central control unit 7 then controls the various parts so as to execute processing correlated with the selected display item, playing a content correlated with the display item, or the like.

Now, while description has been made here that processing is executed in accordance with user instructions by the functions of the user interface control unit 2 and central control unit 7, this is not restricted to this. For example, detected coordinate data is notified to the data object control unit 3 from the input detection device 1 via the user interface control unit 2, or directly.

A configuration wherein the data object control unit 3 then determines the data object instructed (selected) by the user, based on the coordinate data, notifies this to the central control unit 7, and the central control unit 7 executes processing corresponding to the instructed data object, can be made, as a matter of course.

Thus, with the information processing device 100, the user can objectively comprehend the operating state of dragging operations by change in the display mode of the boundary symbol displayed in the user interface region, which changes in accordance with dragging operations performed by the user himself/herself.

Accordingly, adjustment of the degree of scrolling of the item display displayed in the item etc. display selection region can be performed easily and suitably, so intended display items can be found speedily and intended processing can be performed. That is to say, user operability can be improved.

[Specific Example of Display Transition Corresponding to Dragging Operation]

[Case of Performing Dragging Operation from Middle Portion of User Interface Region]

Next, a specific example of display transition corresponding to a dragging operation will be described. FIG. 2 through FIG. 7 are diagrams for describing a display mode of information displayed on the display screen of the display device 5, transitioning corresponding to dragging operations.

First, a case of starting the dragging operation from the middle portion of the user interface region, which will be described later, will be described with reference to FIG. 2 through FIG. 5.

Figure 2:
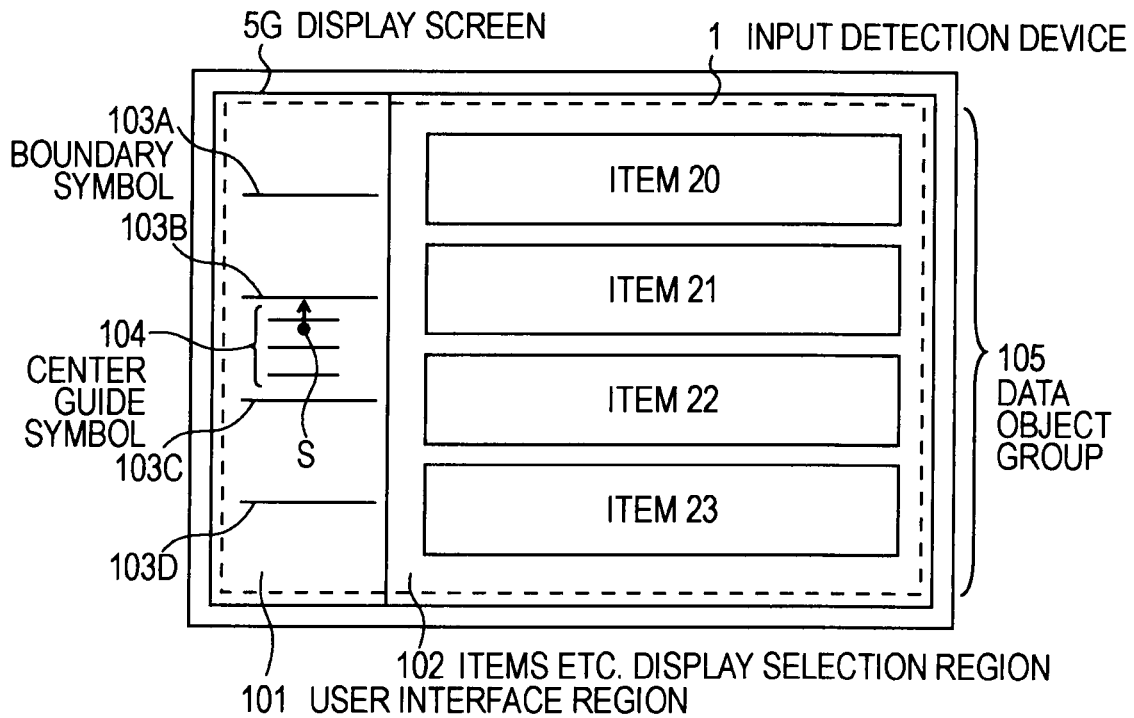
FIG. 2 is a diagram for describing a display mode of information displayed on the display screen of a display device 5, which makes transition in accordance with a dragging operation.

FIG. 2 is a diagram for describing a display state of information displayed on a display screen 5G of the display device 5 before a dragging operation being started as to the input detection device 1 with the information processing device 100.

As described above, with the information processing device 100 according to the present embodiment, the input detection device 1 is applied by adhesion for example, to the entire face of the display screen 5G of the display device of the display device 5, whereby the operating face of the input detection device 1 is formed, as indicated by dotted lines in FIG. 2.

Also, in the case of this example, a user interface region 101 is provided at the left side of the display screen 5G, as shown in FIG. 2. Also, the portion of the display screen 5G other than the user interface region 101 provided to the left side serves as the item etc. display selection region 102.

As shown in FIG. 2, the user interface region 101 and the item etc. display selection region 102 have the same length in the vertical direction of the display screen 5G (direction following the short side of the display screen 5G).

However, the user interface region 101 and the item etc. display selection region 102 are arranged to have a length ratio of around 1 to 4, for example, in the horizontal direction of the display screen 5G (direction following the long side of the display screen 5G).

However, this is but one example, so the user interface region 101 and the item etc. display selection region 102 may be provided with various sizes at various positions within the display screen 5G.

Also, with the information processing device 100 according to the present embodiment, the user interface region 101 is a portion for accepting dragging operations in the present embodiment.

Also, the item etc. display selection region 102 is a portion which displays item groups corresponding to executable functions and playable contents, and enables selection thereof, and is a portion for accepting primarily tapping operations from the user.

With the present embodiment, the user interface region 101 is divided into five portions by four boundary symbols 103A, 103B, 103C, and 103D, which are line segments, as shown in FIG. 2.

With the present embodiment, the boundary symbols 103A, 103B, 103C, and 103D are normally (when no dragging operation is being performed) displayed in the vertical direction of the user interface region 101 so as to divide equally into five regions.

Further, as described above as well, the vertical direction of the user interface region 101 is the direction following the short side of the display screen 5G, and the horizontal direction of the user interface region 101 is the side following the long side of the display screen 5G.

In the case of the present embodiment, a center guide symbol 104, which is three line segments indicating the center, is displayed at the center portion in the vertical direction of the user interface region 101 between the boundary symbol 103B and boundary symbol 103C.

Also, a display item group (data object group) 105 is displayed in the item etc. display selection region 102. In the present embodiment, four display items (data objects) are displayed within the item etc. display selection region 102. With the example in FIG. 2, of the display items of this there are 100 items, the 20th through the 23rd display items are displayed indicating that scrolling can be performed in both the up and down directions.

Then, as shown in FIG. 2, we will say that the user has brought a finger or the like into contact with the operating face of the input detection device 1 at the position where the center guide symbol 104 of the user interface region 101 is displayed, and started a dragging operation in the direction indicated by the arrow. In this example, the position indicated by the symbol S is the start point where the user has first brought the finger or the like into contact. Also, in this example, the dragging start position S is slightly above the center point of the center guide symbol 104.

Figure 3:
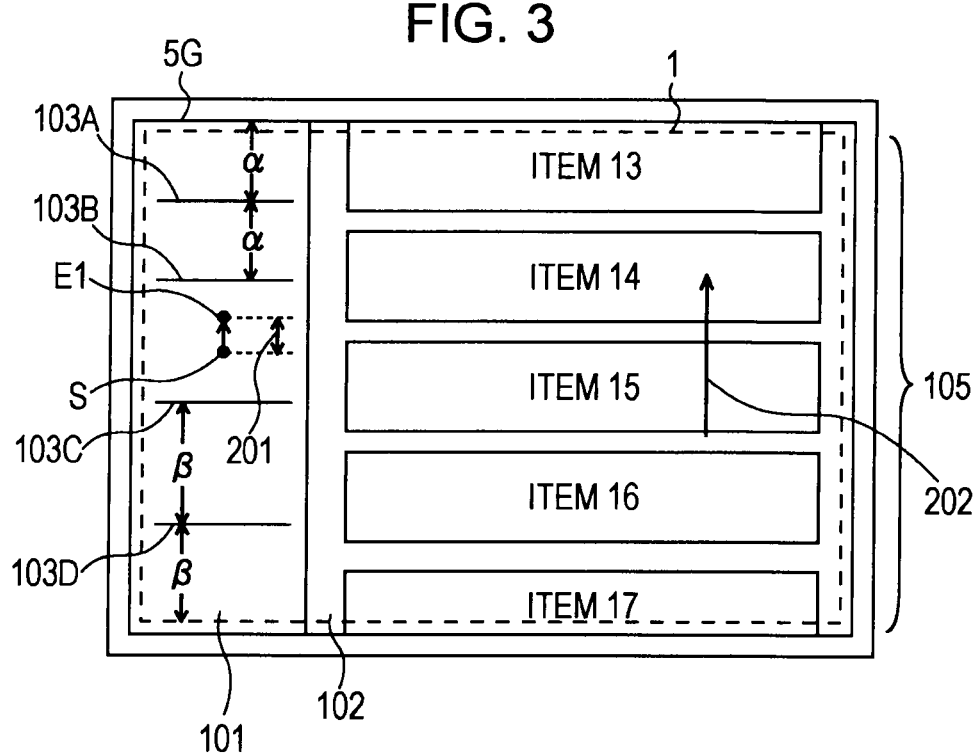
FIG. 3 is a diagram for describing a display mode of information displayed on the display screen of the display device 5, which makes transition in accordance with a dragging operation.

FIG. 3 is a diagram for describing a display state of information displayed in the display screen 5G of the display device 5 immediately after the dragging operation has started in the direction indicated by the arrow in FIG. 2, from the state before starting of the dragging operation shown in FIG. 2.

Upon a dragging operation being performed on the operating face of the input detection device 1 on the user interface region 101, coordinate data corresponding to the contact position on the operating face of the input detection device 1 which changes in accordance to the dragging operation performed by the user, is output from the input detection device 1.

The coordinate data from the input detection device 1 is supplied to the user interface control unit 2. The user interface control unit 2 comprehends the direction of the dragging operation of the user and the amount-of-operation based on the coordinate data from the input detection device 1. The user interface control unit 2 then changes the display position of the boundary symbols in the user interface region 101 in the display memory unit 4 following the comprehended contents.

As shown in FIG. 3, in the case of this example, each of the boundary symbols 103A, 103B, 103C, and 103D have their positions moved in the direction of the dragging operation as compared to the case shown in FIG. 2. Further, the distance between the boundary symbol 103B and the boundary symbol 103C in FIG. 3 becomes wider than that in FIG. 2.

Also, as shown in FIG. 3, the intervals between the boundary symbols 103A, 103B, 103C, and 103D are compressed such as a pattern created in the case of rubber shrinking, as shown in FIG. 3, thereby allowing the user to intuitively recognize the amount-of-operation of the dragging operation.

That is to say, in FIG. 3, the starting point of the dragging operation is indicated by the position S, and the current dragging position is indicated by position E1. The operation direction in this case is the direction upwards as to the display screen 5G, as indicated by the solid arrow from the starting point S to the current dragging position E1.

Also, the amount-of-operation of the dragging operation in this case corresponds to the difference between the starting point S to the current dragging position E1, and accordingly is the size indicated by a two-ended arrow 201 shown in FIG. 3.

Accordingly, the user interface control unit 2 controls the display memory unit 4 to move positions of each of the boundary symbols in the user interface region 101 in the display memory unit 4 in accordance with the amount-of-operation of the dragging operation and the direction of operation thereof.

In this case, with the starting point S of the dragging operation at the time of starting the dragging operation as a reference, the interval between the boundary symbols situated above, and the interval between the upper edge portion of the display screen 5G and the boundary symbol closest to the upper edge portion are made to be uniform even while dragging.

In the same way, with the starting point S of the dragging operation at the time of starting the dragging operation as a reference, the interval between the boundary symbols situated below, and the interval between the lower edge portion of the display screen 5G and the boundary symbol closest to the lower edge portion are made to be uniform even while dragging.

At this time, the order of the upper edge portion of the display screen 5G, boundary symbol 103A, boundary symbol 103B, boundary symbol 103C, boundary symbol 103D, and lower edge portion of the display screen 5G, does not change.

The user interface control unit 2 causes the interval between the boundary symbols and the edge of the display screen 5G and the boundary symbol, to become narrower in the direction of the dragging operation determined in accordance with the current dragging position E1 as to the starting point S of the dragging operation.

Accordingly, in the case of the example shown in FIG. 3, between the boundary symbol 103A and the boundary symbol 103B, and between the upper edge portion of the display screen 5G and the boundary symbol 103A, both become an interval $\alpha$.

In the same way, in the case of the example shown in FIG. 3, between the boundary symbol 103C and the boundary symbol 103D, and between the lower edge portion of the display screen 5G and the boundary symbol 103D, both become an interval $\beta$.

Also, in the case of the example shown in FIG. 3, the direction of the dragging operation is in the direction heading from the starting point S toward the dragging position E1, so interval $\alpha$ is narrower than interval $\beta$. In this way, the intervals between boundary symbols is narrower in the direction of the dragging operation.

Accordingly, the user can intuitively recognize visually in which side the dragging operation position is situated with the starting point S of the dragging operation as a reference, and to what degree the dragging operation is being performed as to the information processing device 100, by the intervals between the boundary symbols and the like.

Also, in the case of the example shown in FIG. 3, the state immediately following the dragging operation having been performed is shown, so the distance from the starting point S to the current dragging position E1, and the magnitude of the amount-of-operation indicated by the two-ended arrow 201 is the same.

In the case of the example in FIG. 3, the user interface control unit 2 obtains the acceleration for scrolling the display items displayed in the item etc. display selection region 102 in accordance with the amount-of-operation indicated by the two-ended arrow 201.

The user interface control unit 2 notifies the data object control unit 3 of the direction of the dragging operation and the obtained acceleration, as described above. Though described later in detail, the data object control unit 3 determines in which direction, and by how much, to scroll the display items displayed in the item etc. display selection region 102, from the direction of the dragging operation and the acceleration.

The data object control unit 3 then changes the position of the display items by scrolling the display items to be displayed on the item etc. display selection region 102 in the display memory unit 4, following the contents decided upon.

In the case of the example shown in FIG. 3, the dragging operation is upwards, as indicated by the arrow in the user interface region 101, so the display items are scrolled in the direction indicated by the arrow 202 in the item etc. display selection region 102. That is to say, in the case of this example, the display items are scrolled in a direction tracing backwards.

Further continuing the dragging operation from the state shown in FIG. 3 then enables changing of the acceleration of the scrolling of the display items to be displayed in the item etc. display selection region 102. In this case, the intervals between the boundary symbols is further changed.

Figure 4:
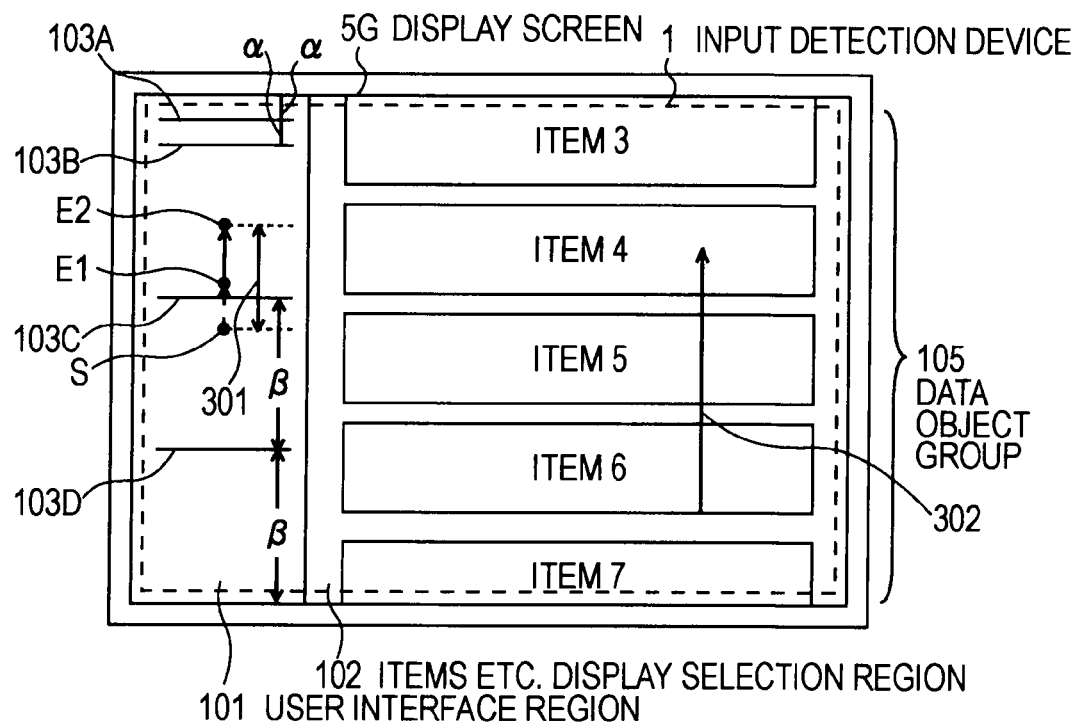
FIG. 4 is a diagram for describing a display mode of information displayed on the display screen of the display device 5, which makes transition in accordance with a dragging operation.

FIG. 4 is a diagram for describing the display state of information displayed in the display screen 5G of the display device 5 in a case of a dragging operation being further performed from the dragging position E1 shown in FIG. 3.

In FIG. 4, let us say that a dragging operation has further been performed from the dragging position E1, such that a dragging operation is performed to a dragging position E2, as indicated by the arrow from the position E1 to the position E2. In this case, the newly-performed dragging operation is from the dragging position E1 to the current dragging position E2.

However, the amount-of-operation of the dragging operation indicated by the difference between the starting point S of the dragging operation to the current dragging position E2 is great as compared to the two-ended arrow 201, as indicated by the two-ended arrow 301 in FIG. 4.

The user interface control unit 2 then controls the display memory unit 4 based on the direction of dragging operation, and the amount-of-operation of the newest dragging operation indicated by the two-ended arrow 301, and changes the positions of the boundary symbols 103A, 103B, 103C, and 103D.

In this case, the amount-of-operation of the dragging operation is even greater from the state shown in FIG. 3, as can be seen by comparing the two-ended arrow 201 shown in FIG. 3 and the two-ended arrow 301 shown in FIG. 4. Accordingly, in the event that the dragging operation is continued in the same direction, from the state shown in FIG. 3 to the state shown in FIG. 4, the interval $\alpha$ is even denser and the interval $\beta$ is even sparser. Further, the distance between the boundary symbol 103B and boundary symbol 103C in FIG. 4 is greater than that in FIG. 3.

That is to say, as shown in FIG. 4, the intervals between the boundary symbol 103A and the upper edge portion of the display screen 5G, and between the boundary symbol 103A and boundary symbol 103B, are both interval $\alpha$ and are uniform. In the same way, the intervals between the boundary symbol 103D and the lower edge portion of the display screen 5G, and between the boundary symbol 103C and boundary symbol 103D, are both interval $\beta$, and are uniform.

However, as can be clearly seen by comparing FIG. 3 and FIG. 4, in the event that a dragging operation is performed from position E1 to position E2, the interval $\alpha$ between boundary symbols and the like positioned above, which is the direction of the dragging operation, with the starting point S of the dragging operation as a reference, is even smaller, and the interval β between boundary symbols and the like positioned below, which is the opposite direction of the dragging operation, is even wider.

Accordingly, the user can accurately tell in which side he/she is performing a dragging operation, and how the information processing device 100 is recognizing this state, in accordance with the display mode of the boundary symbols in the user interface region 101.

Note that as shown in FIG. 4, in the event that a dragging operation is further performed from the previous dragging position E1 in the same direction, to reach the current dragging position E2, the amount-of-operation of the dragging operation this time is from the dragging position E1 to the dragging position E2.

However, with the information processing device 100 according to the preset embodiment, the amount-of-operation of the dragging operation can be obtained as the difference between the starting point S of the dragging operation and the current dragging position E2. Accordingly, the state shown in FIG. 4 has a greater amount-of-operation of dragging operations as compared to the state shown in FIG. 3.

Thus, with the information processing device 100 according to the present embodiment, the amount-of-operation of the dragging operation is always comprehended as being from the starting point of the dragging operation.

The user interface control unit 2 then obtains the acceleration for scrolling the display items to be displayed in the item etc. display selection region 102, based on the amount-of-operation of dragging operations as indicated by the two-ended arrow 301 shown in FIG. 4.

The obtained acceleration and direction of dragging operation are notified to the data object control unit 3, whereby the data object control unit 3 effects control so as to scroll the display items in the display memory unit 4.

Accordingly, the display items displayed in the item etc. display selection region 102 have an even faster scrolling speed in accordance with the amount-of-operation of the dragging operation, as indicated by the arrow 302 in FIG. 4. As shown in FIG. 4, scrolling of the display items is then performed to the display items positioned in a direction tracing backwards.

Note that while FIG. 4 illustrates a case in which a dragging operation has been performed further in the same direction from the state shown in FIG. 3, so that the amount-of-operation of the dragging operation increases, but there are cases wherein a dragging operation is performed in the other direction, so that the amount-of-operation of the dragging operation becomes smaller.

For example, let us say that from the state shown in FIG. 2, a dragging operation has been performed as shown in FIG. 3 and FIG. 4, so as to be at the current dragging position E2. In this case, we will say that a dragging operation has been performed in the other direction, so that the state has been returned from the state shown in user interface region 101 in FIG. 4 to the state shown in user interface region 101 in FIG. 3.

In this case, the actual direction of the dragging operation is the direction from the position E2 toward the position E1, and accordingly is the downward direction as to the display screen 5G. Also, the actual amount-of-operation of the dragging operation is the direction from the position E2 to the position E1.

However, as described above, the direction and amount-of-operation of the dragging operation is arranged at the information processing device 100 to be comprehended with the starting point S of the continuing dragging operation as a reference.

Accordingly, in the event that a dragging operation is performed returning from the position E2 in FIG. 4 to position E1 in FIG. 3, the direction of the dragging operation is the direction from the starting point S of the dragging operation to the current dragging position E1, so the direction of the dragging operation which the information processing device 100 comprehends is unchanged. Also, the amount-of-operation of the dragging operation in this case is the amount-of-operation from the starting point S of the dragging operation to the dragging position E1, and accordingly is the amount indicated by the both-ended arrow 201.

The user interface control unit 2 then controls the display position of the boundary symbols to be displayed on the user interface region 101 in the display memory unit 4 in accordance with the direction and amount-of-operation of the dragging operation. Accordingly, the display mode of the boundary symbols in the user interface region 101 returns from the state shown in the user interface region 101 in FIG. 4 to the state shown in the user interface region 101 in FIG. 3.

Further, the user interface control unit 2 obtains the acceleration of scrolling of the display items displayed in the item etc. display selection region 102, based on the amount-of-operation of the newest dragging operation. Accordingly, the scrolling acceleration of the display items correspond to the magnitude indicated by the both-ended arrow 201.

As described above, the data object control unit 3 then performs scrolling control of the display items displayed in the item etc. display selection region 102 based on the direction of dragging operation and amount-of-operation of dragging operation from the user interface control unit 2.

Accordingly, in the event that a dragging operation is performed so as to return from the position E2 in FIG. 4 to the position E1 in FIG. 3 as described above, the direction of the dragging operation does not change, and only the amount-of-operation of the dragging operation has changed.

Accordingly, in this case, the scrolling direction is not changed, and the display items are scrolled in a direction tracing further backwards from the state shown in FIG. 4. However, the scrolling speed at this time is made to be the same speed as in FIG. 3, i.e., a scrolling speed slower than the scrolling speed in the case of FIG. 4, in accordance with the amount-of-operation of the dragging operation.

Now, let us say that a dragging operation is further performed from the position E1 in FIG. 3 toward the starting point S in FIG. 2. In this case, as the dragging position approaches the starting point S, the direction of the dragging operation is unchanged in being an upwards direction, but the amount-of-operation of the dragging operation rapidly decreases.

Now, the intervals between the boundary symbols in the user interface region 101 are determined in accordance with the amount of dragging operations, as described above. Accordingly, in this case, the interval between boundary symbols in the direction of the dragging operation (the aforementioned interval α) which was narrow becomes wider, and the interval between boundary symbols in the direction opposite to the dragging operation (the aforementioned interval β) which was wide becomes narrower.

Accordingly, at the point that the dragging position of the dragging operation reaches the starting point S of the dragging operation, the boundary symbols 103A through 103D in the user interface region 101 each are in the state shown in the user interface region 101 in FIG. 2.

Also, in this case, during the time up to the dragging position reaching the starting point S of the dragging operation, scrolling of the display items displayed on the item etc. display selection region 102 is also continued.

In this case, during the time up to the dragging position reaching the starting point S of the dragging operation, the direction of scrolling of the display items displayed in the item etc. display selection region 102 does not change. However, as the amount-of-operation of the dragging operation becomes smaller, the acceleration of scrolling becomes smaller.

Accordingly, during the time up to the dragging position reaching the starting point S of the dragging operation from the position E1, the speed of scrolling of the display items displayed in the item etc. display selection region 102 gradually becomes slower.

And, upon the dragging position reaching the starting point S of the dragging operation, the amount-of-operation of the dragging operation becomes 0 (zero), so the scrolling of the display items displayed in the item etc. display selection region 102 stops.

In this way, while dragging operations are being continuously performed as to the operating face of the user interface region 101 on the user interface region 101 the direction and amount-of-operation of the dragging operation are detected every predetermined timing with the dragging starting point S as a reference.

According to these, the display mode of boundary symbols in the user interface region 101 is changed, and also scrolling display of display items in the item etc. display selection region 102 is performed.

Basically, here, as the amount-of-operation of the dragging operation grows larger, of the boundary symbols in the user interface region 101, the interval of the symbol group in the direction of the dragging operation becomes narrower, and the interval of the symbol group in the direction opposite to the dragging operation becomes wider.

Conversely, as the amount-of-operation of the dragging operation grows smaller, of the boundary symbols in the user interface region 101, the interval of the symbol group in the direction of the dragging operation becomes wider, and the interval of the symbol group in the direction opposite to the dragging operation becomes narrower.

In other words, of the boundary symbols in the user interface region 101, if the interval of the symbol group in the direction of the dragging operation is wide (sparse), this means that the amount-of-operation of the dragging operation (operation ratio) is small. Also, if the interval of the symbol group in the direction of the dragging operation is narrow (dense), this means that the amount-of-operation of the dragging operation (operation ratio) is great.

Also, with the information processing device 100 according to the present embodiment, continuous dragging operations can be performed from anywhere on the user interface region 101.

Figure 5:
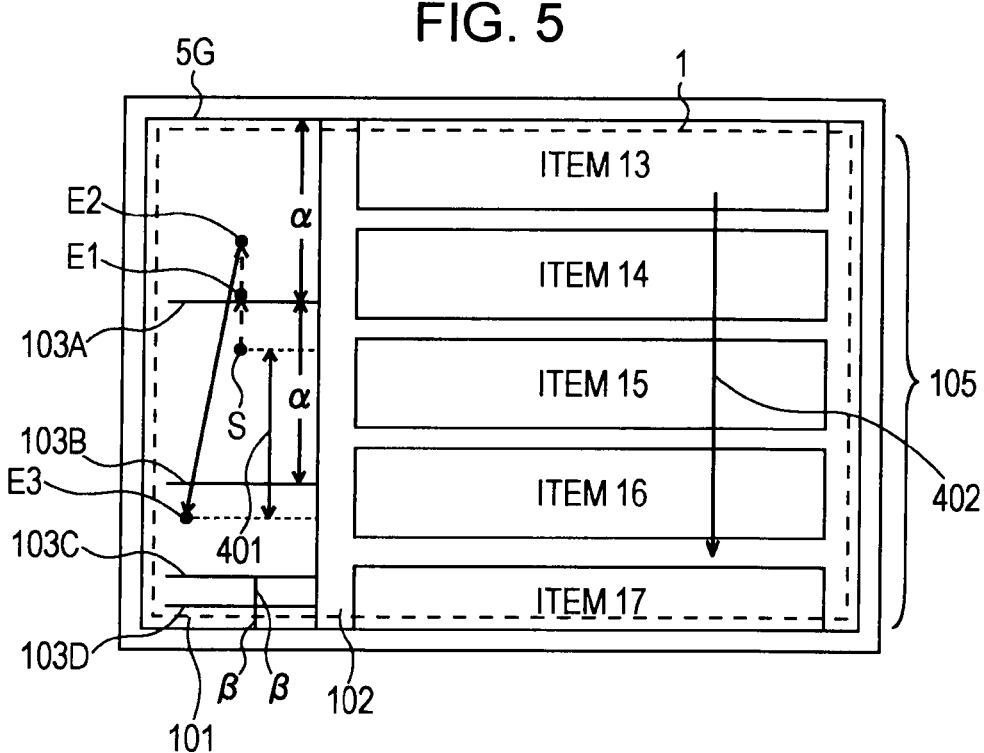
FIG. 5 is a diagram for describing a display mode of information displayed on the display screen of the display device 5, which makes transition in accordance with a dragging operation.

FIG. 5 is a diagram for describing a display state of information displayed on the display screen 5G of the display device 5 in the event that a great dragging operation has been performed from the dragging position E2 in a direction opposite to that so far.

As described with reference to FIG. 2, FIG. 3, and FIG. 4, we will say that the dragging operation has been performed in the manner of starting point S→position E1→position E2. We will then say that, as shown in FIG. 5, after the current dragging position has reached the position E2, a large dragging operation is performed from the upper right of the user interface region 101 to the lower left thereof, without the finger or the like in contact with the operating face of the input detection device 1 therein ever having left the face thereof.

In this case as well, the display positions of the boundary symbols in the user interface region 101 are also changed based on the direction of the dragging operation and the amount-of-operation of the dragging operation. At the same time, the display items displayed in the item etc. display selection region 102 also have a scrolling display made thereof, based on the acceleration determined according to the direction of the dragging operation and the amount-of-operation of the dragging operation.

In this case, as described above as well, during the time of the operating position of the dragging operation reaching the starting point S from the position E2, of the boundary symbols in the user interface region 101, the interval of the symbol group in the direction of the dragging operation becomes wider. Also, the interval of the symbol group in the opposite direction of the dragging operation becomes narrower. Upon the dragging position returning to the starting point S of the dragging operation, the boundary symbols in the user interface region 101 return to the display state shown in FIG. 2.

Also, during the time of the operating position of the dragging operation reaching the starting point S from the position E2, the direction of scrolling of the display items in the item etc. display selection region 102 is not changed, but the speed of scrolling gradually becomes slower. Upon the dragging position then returning to the starting point S of the dragging operation, the scrolling of the display items in the item etc. display selection region 102 is stopped.

Upon the dragging operation being further continued, and the dragging position being situated below the starting point S in the display screen 5G, the direction of the dragging operation is downwards as to the display screen 5G, so the amount-of-operation of the dragging operation gradually increases.

In this case, then, the interval α between the upper edge portion of the display screen 5G and the boundary symbol 103A, and between the boundary symbol 103A and boundary symbol 103B, becomes wider. Conversely, the interval β between the boundary symbol 103C and boundary symbol 103D, and between the lower edge portion of the display screen 5G and the boundary symbol 103D, in the direction of the dragging operation, becomes narrower.

In this case, the interval α between the upper edge portion of the display screen 5G and the boundary symbol 103A, and between the boundary symbol 103A and boundary symbol 103B, are equal. Also, the interval β between the boundary symbol 103C and boundary symbol 103D, and between the lower edge portion of the display screen 5G and the boundary symbol 103D, are equal. Also, the ratio between the boundary symbol 103B and the starting point S, and the starting point S and the boundary symbol 103C, is also the same.

In the case shown in FIG. 5, the direction of the dragging operation is the downwards direction on the display screen 5G, as indicated by the solid arrow heading from the upper right to the lower left in FIG. 5. Accordingly, the edge of the operating face of the input detection device 1 in the direction of the dragging operation is the lower edge portion of the display screen 5G.

Accordingly, in the case of the example shown in FIG. 5, the interval α between the upper edge portion of the display screen 5G and the boundary symbol 103A, and between the boundary symbol 103A and boundary symbol 103B, becomes wider. Also, the interval β between the boundary symbol 103C and boundary symbol 103D, and between the lower edge portion of the display screen 5G and the boundary symbol 103D, becomes narrower.

In this way, in the case of the example shown in FIG. 5, the interval α between the upper edge portion of the display screen 5G and the boundary symbol 103A, and between the boundary symbol 103A and boundary symbol 103B, is equal.

Also, the interval β between the boundary symbol 103C and boundary symbol 103D, and between the lower edge portion of the display screen 5G and the boundary symbol 103D, is equal. The intervals in the tracing direction side are narrower, so the interval β becomes smaller than the interval α.

Further, the distance between the boundary symbol 103B and boundary symbol 103C in FIG. 5 is narrower than that in FIG. 2. In this example, the dragging starting point S is slightly above the center point of the center guide symbol, but in a case where the dragging starting point S is at the center point of the center guide symbol, the distance between the boundary symbol 103B and boundary symbol 103C is constantly maintained the same.

As the dragging position nears the lower edge portion of the display screen 5G, the amount-of-operation of the dragging operation increases, so the interval between boundary symbols is gradually narrowed. Finally, the interval between the boundary symbol 103C and boundary symbol 103D below the initial dragging starting point S, and the interval between the boundary symbol 103D and the lower edge portion of the display screen 5G, are narrowed to where they are overlaid and displayed at the same position.

Also, as described above, the direction of the dragging operation is downwards as to the display screen 5G, and as the amount-of-operation of the dragging operation gradually increases, the scrolling direction and the scrolling speed of the display items in the item etc. display selection region 102 are changed accordingly.

In this case, the scrolling direction is the downwards direction in the display screen 5G as indicated by the solid arrow 402 in FIG. 5. Also, the speed of scrolling is determined based on the acceleration determined according to the amount-of-operation of the dragging operation, as also described above.

With the example shown in FIG. 5, upon the dragging position being situated below the starting point S of the dragging operation, the boundary symbols are moved to the lower side of the display screen 5G, so the fact that the direction of the dragging operation has been reversed can be clearly known.

[Case of Performing Dragging Operation from Edge of User Interface Region]

Next, a case of starting a dragging operation from the edge of the user interface region will be described with reference to FIG. 6 and FIG. 7.

Figure 6:
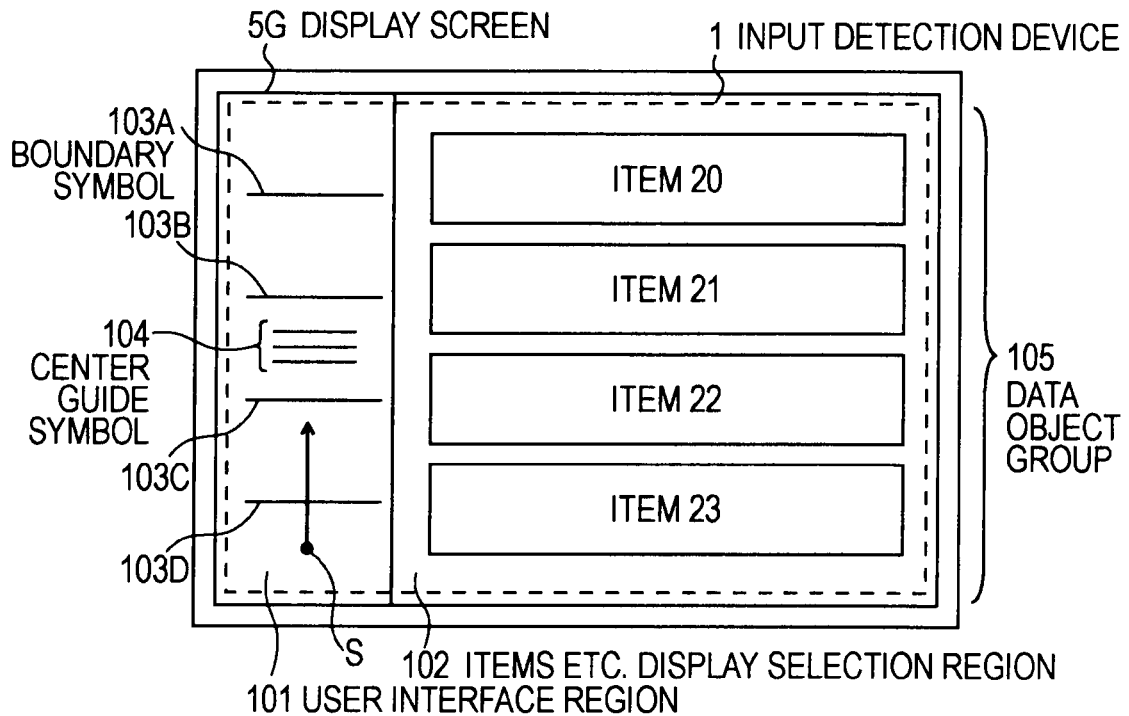
FIG. 6 is a diagram for describing a display mode of information displayed on the display screen of the display device 5, which makes transition in accordance with a dragging operation.

FIG. 6 is a diagram for describing the display state of information displayed on the display screen 5G of the display device 5 before a dragging operation being performed to the input detection device 1, with the information processing device 100. Accordingly, the display mode of the user interface region 101 and item etc. display selection region 102 are the same state as the case described with reference to FIG. 2.

As shown in FIG. 6, let us say that the user has bought a finger or the like into contact with the operating face of the input detection device 1 near the lower edge of the user interface region 101, and has started a dragging operation in the direction indicated by the arrow. In this case as well, the position which the Symbol S indicates is the start point where the user has brought the finger or the like into contact with, first.

Figure 7:
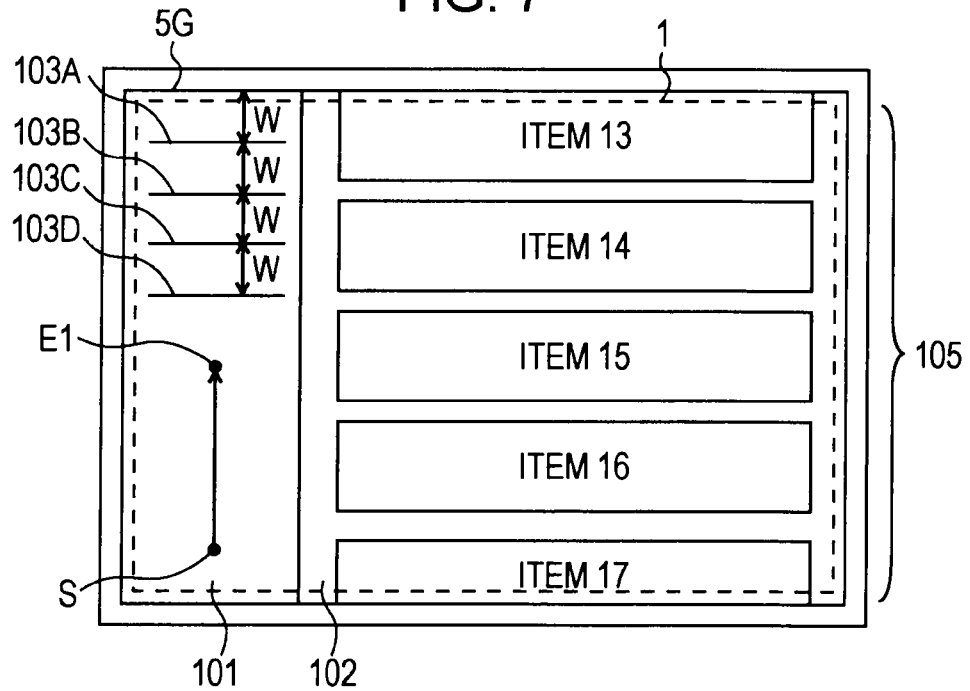
FIG. 7 is a diagram for describing a display mode of information displayed on the display screen of the display device 5, which makes transition in accordance with a dragging operation.

FIG. 7 is a diagram for describing the display state of information displayed on the display screen 5G of the display device 5, immediately after the dragging operation has been started in the direction indicated by the arrow in FIG. 6, from the state immediately before starting the dragging operation shown in FIG. 6.

As described above, upon a dragging operation being performed as to the operating face of the input detection device 1, coordinate data corresponding to the contact position on the operating face of the input detection device 1 which changes in accordance with the dragging operation performed by the user, is output from the input detection device 1.

The coordinate data from the input detection device 1 is supplied to the user interface control unit 2, and at the user interface control unit 2 the direction and amount-of-operation of the dragging operation of the user is comprehended. The user interface control unit 2 then changes the display position of the boundary symbols in the user interface region 101 in the display memory unit 4 in accordance with the contents comprehended.

In the case of the example in FIG. 6 and FIG. 7, all boundary symbols are on the dragging operation side from the starting point S, so the boundary symbols 103A, 103B, 103C, and 103D, of the user interface region 101, move so that the display positions thereof move to the direction of the dragging operation as compared with the case shown in FIG. 6, as shown in FIG. 7.

Also, as shown in FIG. 7, the intervals between the boundary symbols 103A, 103B, 103C, and 103D, of the user interface region 101, are compressed such as a pattern created in the case of rubber shrinking, as shown in FIG. 7, thereby allowing the user to intuitively recognize the amount-of-operation of the dragging operation.

That is to say, in FIG. 7, the starting point of the dragging operation is indicated by the position S, and the current dragging position is indicated by position E. The operation direction in this case is the direction upwards as to the display screen 5G, as indicated by the solid arrow from the starting point S to the current dragging position E. Also, the amount-of-operation of the dragging operation in this case corresponds to the difference between the starting point S and the current dragging position E, as described above as well.

Accordingly, the user interface control unit 2 controls the display memory unit 4, so as to move the positions of the boundary symbols 103A, 103B, 103C, and 103D, in the user interface region 101 in the display memory unit 4 in the direction in which the dragging operation has been performed, in accordance with the amount-of-operation of the dragging operation and the direction of the operation.

In the case of the example shown in FIG. 6 and FIG. 7 as well, the boundary symbols 103A, 103B, 103C, and 103D are all displayed at uniform intervals, including the upper edge portion of the display screen 5G.

As described above, "the intervals between the line group and the upper edge or lower edge from the point of time of starting dragging are uniform." So controlling the display positions of the boundary symbols allows stretching and shrinking of rubber to be expressed in the user interface region 101. Accordingly, in the state before the dragging operation is started, the intervals between the boundary symbols situated in the direction of the dragging operation from the starting point of the dragging operation are controlled so as to be uniform intervals.

In the case of the example shown in FIG. 6 and FIG. 7, the starting point S of the dragging operation is at a position near the lower edge portion of the user interface region 101, and the direction of the dragging operation is the upwards direction as indicated by the arrows in FIG. 6 and FIG. 7. Accordingly, the boundary symbols 103A, 103B, 103C, and 103D are each situated in the direction of the dragging operation from the starting point S.

In this case, the intervals between the symbols are maintained uniform, and the intervals are narrowed or compressed in accordance with the amount-of-operation of dragging operation and the direction of operation, obtained with the starting point S as a reference, as shown in FIG. 7.

Accordingly, due to the display mode of the boundary symbols in the user interface region 101, the user interface region 101 portion can be displayed as if rubber were stretching or shrinking in accordance with dragging operations.

Note that description has been made here with regard to an example of a case in which the starting point S of the dragging operation is situated near the lower edge of the display screen 5G. However, there are cases where the starting point S of the dragging operation is situated near the upper edge of the display screen 5G.

In this case, the moving direction of the boundary symbols is opposite to the case shown in FIG. 7. However, the change in the display mode of the boundary symbols is the same as with the case shown in FIG. 7, in that in the state before the dragging operation being started, the intervals between the boundary symbols situated in the direction of the dragging operation from the starting point S of the dragging operation are uniform intervals.

Also, with regard to scrolling display of the display items in the item etc. display selection region 102, the case of the example shown in FIG. 6 and FIG. 7 is performed in the same way as with the case described with reference to FIG. 2 through FIG. 5.

That is to say, the user interface control unit 2 obtains the direction of the dragging operation and the acceleration of scrolling determined in accordance with the amount-of-operation of the dragging operation, in accordance with the coordinate data from the input detection device 1, and notifies this to the data object control unit 3.

Based on the information from the user interface control unit 2, the data object control unit 3 controls the display position of the display items in the display memory unit 4, and performs scrolling display of display items at an acceleration corresponding to the amount-of-operation of the dragging operation, in the direction corresponding to the direction of the dragging operation.

Thus, the information processing device 100 according to the present embodiment does not simply scroll display items in accordance with dragging operations made by the user. The display mode of boundary symbols in the user interface region is changed corresponding to stretching and shrinking of rubber, in accordance with dragging operations performed as to the user interface region 101.

Accordingly, the user can intuitively recognize visually how the information processing device 100 is recognizing the operations which he/she is performed at the user interface region 101, in accordance with the display mode of the boundary symbols in the user interface region 101.

Accordingly, the user can appropriately recognize whether the dragging operations he/she is performed are too strong or too weak, speedily adjust the intensity of the dragging operations, and scroll the display items at an intended mode.

[Processing when Accepting Dragging Operations at the Information Processing Device 100]

Figure 8:
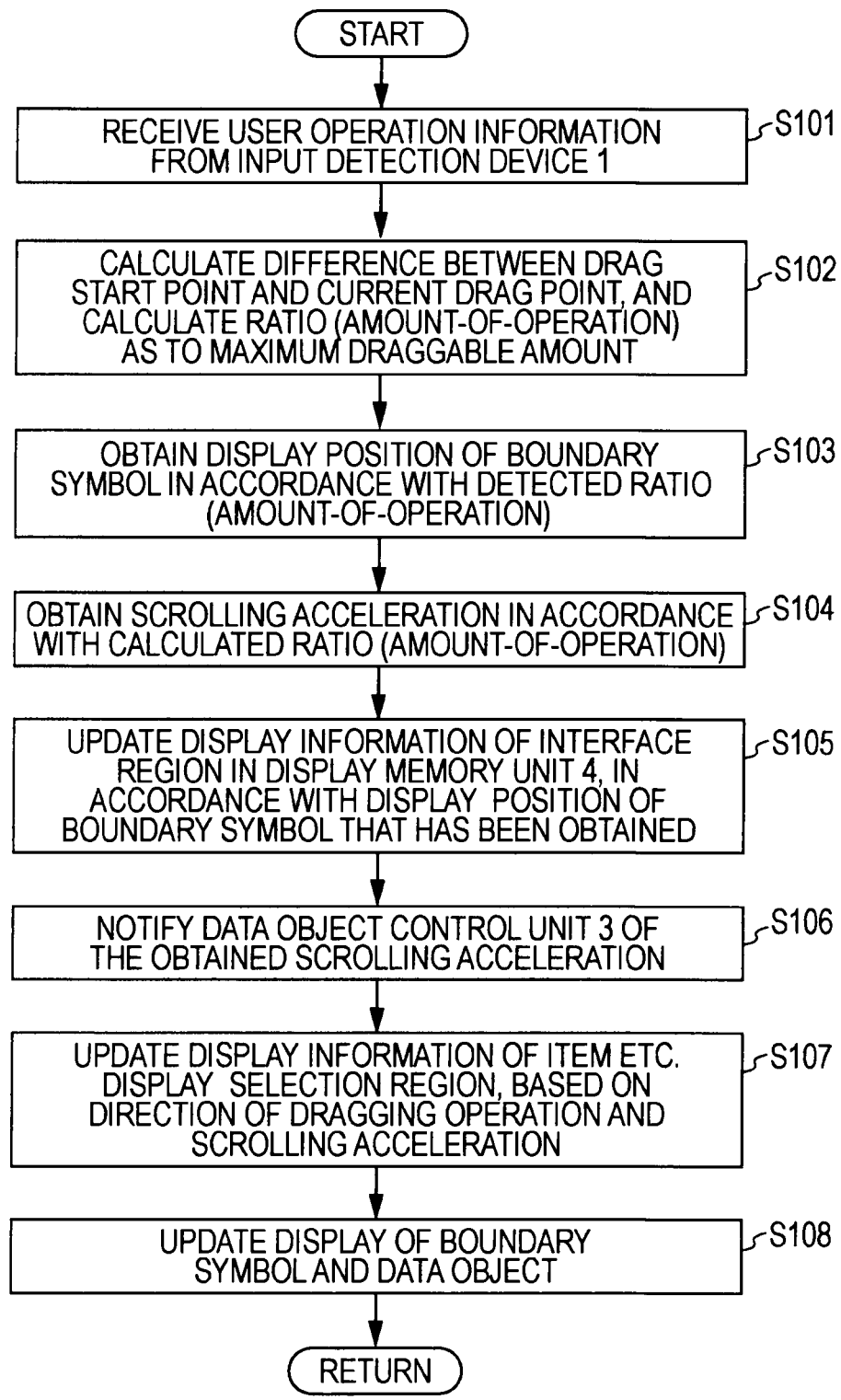
FIG. 8 is a flowchart for describing processing at the time of a dragging operation performed at the information processing device 100.

FIG. 8 is a flowchart for describing processing at the time of dragging operations performed at the information processing device 100 according to the present embodiment.

The processing shown in FIG. 8 is performed in the event that the power has been turned on to the information processing device 100, and a dragging operation has been performed on the operating face of the input detection device 1 on the user interface region 101. The processing shown in FIG. 8 is primarily executed by the user interface control unit 2 and the data object control unit 3.

That is to say, upon a dragging operation being performed as to the operating face of the input detection device 1 on the user interface region 101, the user interface control unit 2 and data object control unit 3 cooperatively execute the processing shown in FIG. 8.

First, the user interface control unit 2 receives user operation information from the input detection device 1 (step S101). Here, the user operation information is coordinate data corresponding to the operating face of the input detection device 1 which changes in accordance to dragging operations.

The user interface control unit 2 calculates the difference between the starting point of the dragging operation (dragging starting point) and current dragging position in accordance with the received user operation information, and calculates the ratio of this difference as to the maximum draggable amount (step S102).

In this step S102, the vertical length of the user interface region 101 (length of display screen 5G in the direction of the short sides) is the maximum draggable amount, which will be described in detail later. The ratio of the difference between the dragging starting point and the current dragging position in the short side direction of the display screen of the user interface region 101, as to the maximum draggable amount, is then calculated.

Accordingly, the position in the horizontal direction of the display screen (longitudinal direction of the display screen) does not have to be taken into consideration with the user interface region 101, and the vertical direction dragging operations of the user on the user interface region 101 can be detected.

The user interface control unit 2 obtains the display position of the boundary symbols displayed in the user interface region 101, in accordance with the position of the starting point, the direction of the dragging operation as to the starting point, and the ratio of the dragging operation (amount-of-operation) (step S103).

For example, the display positions of boundary symbols are stored and held in the coefficient and data storage unit 6, with the three types of information of the position of the starting point of the dragging operation on the user interface region 101, the direction of the dragging operation with the starting point as a reference, and the amount-of-operation of the dragging operation, in a correlated manner.

The user interface control unit 2 makes reference to the coefficient and data storage unit 6 based on the information obtained as described above, and thereby can identify the display position of the boundary symbols on the user interface region 101.

Further, the user interface control unit 2 obtains the acceleration for scrolling in the case of scrolling the display items, in accordance with the amount-of-operation of the dragging operation (ratio) (Step S104). In the processing in this step S104 as well, the acceleration of scrolling can be uniquely identified corresponding to the amount-of-operation of the dragging operation.

More specifically, for example, the coefficient and data storage unit 6 stores and holds scrolling acceleration correlated with the amount-of-operation of the dragging operation. The corresponding acceleration data is then read out from a predetermined area in the coefficient and data storage unit 6, based on the obtained amount-of-operation of the dragging operation. Thus, the scrolling acceleration can be obtained in accordance with the amount-of-operation of the dragging operation.

Subsequently, the user interface control unit 2 updates the display positions of the boundary symbols in the user interface region 101, stored and held in the display memory unit 4, based on the obtained display positions of the boundary symbols (step S105).

Also, the user interface control unit 2 notifies the data object control unit 3 of the direction of the dragging operation and the obtained scrolling acceleration (step S106).

The data object control unit 3 updates the display information of the item etc. display selection region 102 (display position of display items) in the display memory unit 4, in accordance with the direction of the dragging operation and scrolling acceleration from the user interface control unit 2 (step S107).

Subsequently, the display device 5 displays the updated display information (boundary symbols and display items (data objects)) in the display memory unit 4, on the display screen of its own display device (Step S108).

The processing shown in this FIG. 8 is then repeatedly performed every predetermined timing during the dragging operation being continuously performed as to the operating face of the input detection device 1 in the user interface region 101.

The correlation of display of the boundary symbols in the user interface region 101 can be changed, and also display items (data objects) displayed in the item etc. display selection region 102 can be subjected to scrolling display, in accordance with dragging operations of the user.

[Details of Scrolling Display of Display Items in Item Etc. Display Selection Region]

Next, processing for performing scrolling display of the display items in the item etc. display selection region 102 corresponding to user dragging operations, performed at the information processing device 100 according to the present embodiment, will be described.

[How to Obtain Amount-of-Operation of Dragging Operation]

First, an example of processing in the case of obtaining the amount-of-operation of a dragging operation performed on the operating face of the input detection device 1 on the user interface region 101 will be described.

Figure 9:
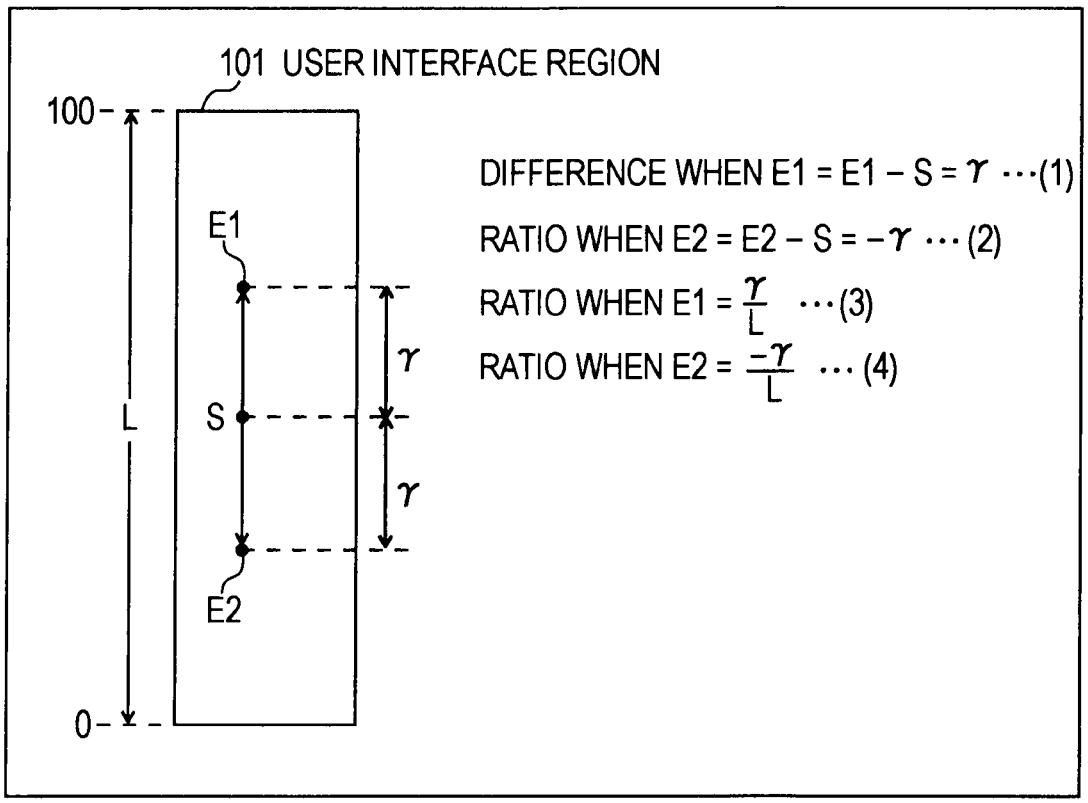
FIG. 9 is a diagram for describing an example of processing in a case of obtaining the amount-of-operation of a dragging operation.

FIG. 9 is a diagram for describing an example of processing in the case of obtaining the amount-of-operation of a dragging operation. As shown in FIG. 9, as well, dragging operations are primarily performed in the vertical direction (direction following the short side of the display screen 5G) of the user interface region 101.

Accordingly, as indicated by the both-ended arrow L in FIG. 9, the length L of the vertical direction of the user interface region 101 is the maximum draggable amount. Also, in the example shown in FIG. 9, a case is shown wherein the lower edge portion of the user interface region is a value "0 (zero)", and the upper edge portion is a value "100", so that the maximum draggable amount is the value "100".

Also, as shown in FIG. 9, we will consider a case in which the starting point of the dragging operation is position S, and dragging operations of the same magnitude γ are performed each in the upwards direction (upper edge direction) and downwards direction (lower edge direction) of the user interface region 101.

First, we will consider a case wherein a dragging operation of a magnitude of γ is performed from the starting point S in the upwards direction, so as to reach the dragging position E1. The difference between the starting point S and the current dragging position E1 in this case is, as indicated in Expression (1) shown in FIG. 9, calculated by subtracting the vertical-direction coordinate position of the starting point S from the vertical-direction coordinate position of the dragging position E1.

Now, in this case, the vertical-direction coordinate position of the dragging position E1 is greater than the vertical-direction coordinate position of the starting point S, so the obtained value will be a positive value. Accordingly, the difference in this case is "+γ".

Next, we will consider a case wherein a dragging operation of a magnitude of γ is performed from the starting point S in the downwards direction, so as to reach the dragging position E2. The difference between the starting point S and the current dragging position E1 in this case is, as indicated in Expression (2) shown in FIG. 9, calculated by subtracting the vertical-direction coordinate position of the starting point S from the vertical-direction coordinate position of the dragging position E2.

Now, in this case, the vertical-direction coordinate position of the dragging position E2 is smaller than the vertical-direction coordinate position of the starting point S, so the obtained value will be a negative value. Accordingly, the difference in this case is "−γ".

The ratio of the difference in the case of having performed a dragging operation from the starting point S to the dragging position E1 as to the maximum draggable amount is obtained by Expression (3) shown in FIG. 9. Also, the ratio of the difference in the case of having performed a dragging operation from the starting point S to the dragging position E2 as to the maximum draggable amount is obtained by Expression (4) shown in FIG. 9.

Now, in the case of this example, the ratio obtained by Expression (3) and Expression (4) in FIG. 9 represents the operation ration of the dragging operation, i.e., the amount-of-operation of the dragging operation. In this case, the absolute value of the obtained ratio indicates the magnitude of the amount-of-operation, and the sign of the ratio indicates the direction of the dragging operation.

The user interface control unit 2 then determines the dragging position of the boundary symbol to be displayed on the user interface region 101 in the display memory unit 4 in accordance with the direction of the dragging operation and the amount-of-operation of the dragging operation that have been obtained, and controls the display position thereof.

Also, the user interface control unit 2 obtains the scrolling direction and scrolling acceleration of the display items displayed in the item etc. display selection region 102 in accordance with the direction of the dragging operation and the amount-of-operation of the dragging operation that have been obtained.

[How to Obtain Scrolling Acceleration of Display Items]

Next, the processing will be described regarding a case of obtaining the scrolling direction and scrolling acceleration of display items, obtained based on the direction of the dragging operation and the amount-of-operation of the dragging operation that have been obtained.

In the case of this example, the direction of scrolling of the display items is uniquely determined in accordance with the direction of dragging operations. That is to say, as described above, the direction of the dragging operation is uniquely determined in accordance with the current dragging position as to the starting point S of the dragging operation.

Specifically, in the event that the dragging position is above the starting point S of the dragging operation, the scrolling direction is the upwards direction, and in the event that the dragging position is below the starting point S of the dragging operation, the scrolling direction is the downwards direction. Accordingly, in the case of the example shown in FIG. 9, this can be identified by the difference of dragging operations and sign of the ratio.

Figure 10:
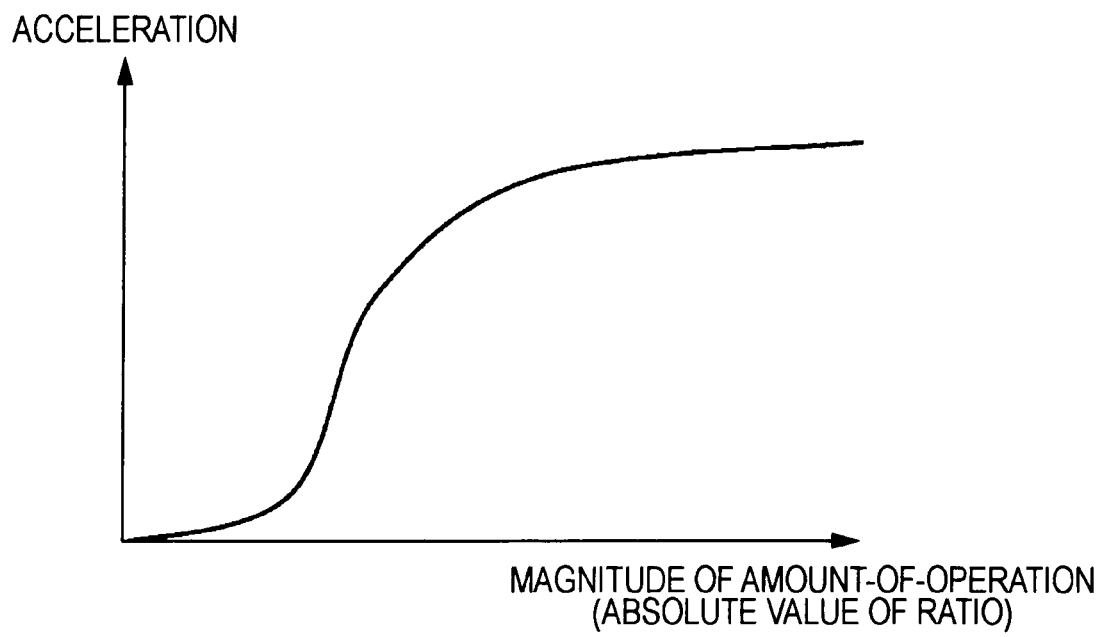
FIG. 10 is a diagram for describing processing in a case of obtaining acceleration of scrolling in accordance with the magnitude of amount-of-operation of a dragging operation.

Also, the scrolling acceleration can be uniquely determined by the magnitude of the amount-of-operation of the dragging operation (absolute value of the amount-of-operation). FIG. 10 is a diagram for describing processing in the case of obtaining the scrolling acceleration in accordance with the magnitude of the amount-of-operation of the dragging operation.

In FIG. 10, the horizontal axis represents the magnitude of the amount-of-operation of the dragging operation, and the vertical axis represents the acceleration of scrolling. The information corresponding to the graph shown in FIG. 10 is stored and held in the coefficient and data storage unit 6 for example, such that if the magnitude of the amount-of-operation of the dragging operation can be obtained, the scrolling acceleration also can be uniquely obtained accordingly.

In the case of the example shown in FIG. 10, in the event that the dragging position is moving in a direction away from the starting point S of the dragging operation, the acceleration of scrolling gradually rises at first. Subsequently, in the event that the dragging position from the starting point S of the dragging operation is removed therefrom by a predetermined amount, the scrolling acceleration rapidly rises, and thereafter gradually rises again.

This, with the information processing device according to the present embodiment, the scrolling direction is identified corresponding to the starting point S of the dragging operation. Also, the scrolling acceleration is identified based on the magnitude of the amount-of-operation of the dragging operation.

[How to Obtain Scrolling Speed of Display Items Based on Scrolling Acceleration]

Next, processing will be described in detail regarding a case of determining scrolling speed in a case of actually scrolling display items, based on the scrolling direction and scrolling acceleration obtained as described above.

Figure 11:
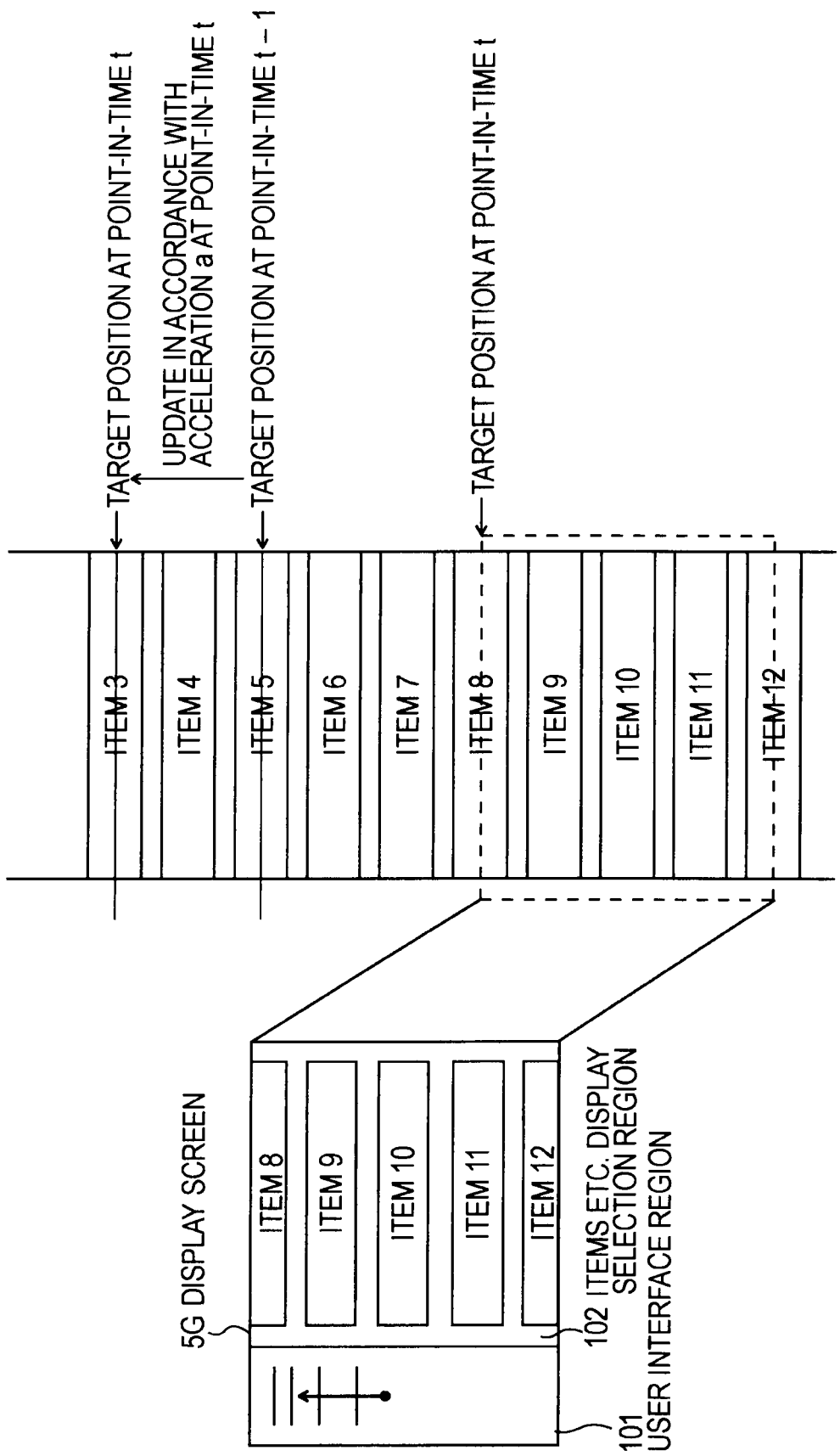
FIG. 11 is a diagram for describing processing in a case of scrolling display items in accordance with dragging operations of a user.

FIG. 11 is a diagram for describing processing in a case of scrolling display items in accordance with user dragging operations. In FIG. 11, the drawing to the right side illustrates a display state of display items and the like at a current point-in-time (point-in-time t) following scrolling having been started in accordance with a dragging operation.

Also, in FIG. 11, the drawing to the left illustrates the array of display items (data objects) of which a scrolling display is made that is stored in held in the memory of the data object control unit 3, for example.

That is to say, let us say that as shown in FIG. 11, a dragging operation such as indicated by the arrow has been made on the user interface region 101 provided to the left side of the display screen 5G. AS described above, processing for changing the display position of the boundary symbols displayed in the user interface region 101 is then started, as well as scrolling processing for the display items displayed in the item etc. display selection region 102 being started.

Then, we will say that at the current point-in-time t, the item etc. display selection region 102 is in a state of displaying from partway of item 8, item 9, item 10, item 11, and partway of item 12, as shown in FIG. 11. That is to say, as illustrated in the drawing to the right side of FIG. 11, the array of display items regarding which scrolling display is being made is the region surrounded by dotted lines.

As described with reference to FIG. 10, scrolling acceleration a at this point-in-time t can be uniquely identified in accordance with the magnitude of amount-of-operation of the dragging operation at the point-in-time t. The acceleration a at this point-in-time t means the rate at which speed changes over a unit time.

Here, a unit time is a timing increment for detecting acceleration in accordance with the amount-of-operation of the dragging operation, and acceleration is equivalent to the amount of scrolling (amount of motion) of the display items in the unit time.

Accordingly, adding the acceleration at the point-in-time t (amount of scrolling per increment time) to the target position of scrolling at point-in-time t−1 which is the detection timing for scrolling acceleration one timing before the point-in-time t obtains the intended position of scrolling at the point-in-time t.

This will be described in more detail. As illustrated surrounded by dotted lines in the drawing to the right side in FIG. 11, we will say that at point-in-time t, the item etc. display selection region 102 in the display screen 5G is at a state displaying partway through item 8 to partway through item 12. Accordingly, the head of the display in at the point-in-time t is the position partway through item 8, as shown in FIG. 11.

As illustrated to the right side in FIG. 11, we will say that the intended position of scrolling at point-in-time t−1 at the point-in-time one before the point-in-time t (detection timing of acceleration one before the point-in-time t) is the position partway through item 5.

This intended position of scrolling can be obtained at the time of starting scrolling by adding the acceleration of scrolling initially identified, to the head position of display items displayed in the display screen 5G at the point-in-time of starting scrolling.

Thereafter, at each timing for identifying the acceleration of scrolling, the intended position of scrolling can be identified for each detection timing of acceleration, by adding the acceleration of scrolling identified this time to the intended position of scrolling from the previous time.

Now, we will say that the acceleration a at the point-in-time t, i.e., the amount of scrolling per unit time, is two display items worth. Now, as described above, the intended position of scrolling at point-in-time t−1 is partway through item 5 as illustrated in the drawing to the right side of FIG. 11.

Accordingly, the intended position of scrolling at the point-in-time t can be obtained by adding the acceleration a (two items worth) at the point-in-time t to the intended position of scrolling at point-in-time t−1 (partway through item 5). In this case, the intended position of scrolling at point-in-time t is partway through item 3, as illustrated in the drawing to the right side of FIG. 11.

Now, in the case of this example, the scrolling speed per unit time at point-in-time t can be obtained by subtracting the display position at point-in-time t (the head position of the display items) from the intended position at point-in-time t, and further multiplying by a predetermined coefficient.

Figures 12, 13:
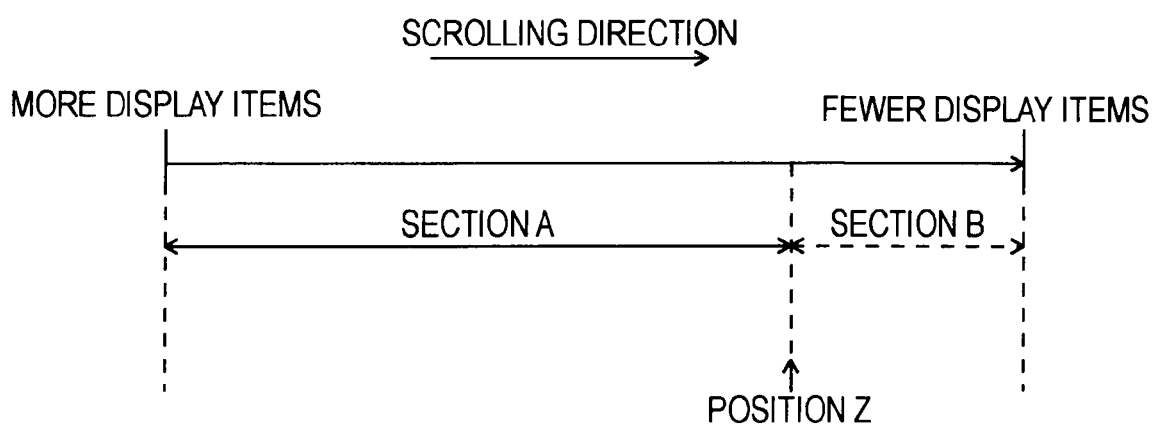
FIG. 12 is a diagram for describing a calculation expression in a case of calculating scrolling speed.
FIG. 13 is a diagram for describing change in scrolling speed at the information processing device 100.

FIG. 12 is a diagram for describing calculation expressions in the case of calculating scrolling speed. Here, description will be made regarding the case of the example described with reference to FIG. 11. In order to obtain the scrolling speed V at the point-in-time t (current point), first, the acceleration at the point-in-time t is added to the intended position of scrolling at the point-in-time t−1 which is the detection timing of acceleration one timing before point-in-time t.

Now, as indicated by Expression (1) in FIG. 12, the display position of display items at point-in-time t (head position of displayed display items) is subtracted from the intended position of scrolling that the point-in-time t. Thus, the distance from the head position of display items displayed at point-in-time t to the intended position of scrolling can be obtained.

Then, as indicated by Expression (1) in FIG. 12, the distance of scrolling per unit time at point-in-time t, i.e., the scrolling speed V per unit time at point-in-time t, can be obtained by multiplying the distance obtained by the subtraction, by a predetermined coefficient.

Accordingly, at the point-in-time t, the display items can be scrolled in accordance with dragging operations by performing scrolling of the display items by an amount worth of the scrolling speed V in the scrolling direction corresponding to the dragging operation.

That is to say, as indicated by Expression (2) in FIG. 12, the scrolling speed V1 at the point-in-time t−1 one before the point-in-time t is obtained by subtracting the head position of display items displayed at point-in-time t−1 from the intended position at the point-in-time t−1, and multiplying this by a predetermined coefficient.

Now, the display position X of display items (head position of display items) at the point-in-time t is the position advanced from the point-in-time t−1 by an amount worth of the scrolling speed V1. Accordingly, as indicated by Expression (3) in FIG. 12, the display position X at the point-in-time t is identified by adding the display position of display items at the point-in-time t−1 to the scrolling speed V1 at the point-in-time t−1.

Thus, at a point-in-time of obtaining the scrolling acceleration, the speed of scrolling is identified, and the scrolling speed is added to the current display position of display items (head position of display items). Accordingly, which display item to display at the head portion of the item etc. display selection region 102 next can be identified.

Note that here as well, the unit time is the intervals between timings of obtaining acceleration, and in the information processing device according to the present embodiment, the dragging position is detected every predetermined timing occurring at equal intervals to obtain the amount-of-operation of the dragging operation, and the acceleration is obtained accordingly.

Now, the speed of scrolling to be obtained is the speed per unit time, so the speed of this scrolling can be said to be the distance of scrolling (amount of motion) of display items per unit time per se.

FIG. 13 is a diagram for describing the change in scrolling speed at the information processing device 100 according to the present embodiment. In FIG. 13, we will say that the display items displayed in the item etc. display selection region 102 are at a position where a great number of display items exist in the scrolling direction. In this case, upon a dragging operation being performed, the number of display items of the display candidates is smaller and smaller, as indicated by arrow in FIG. 13.

As described with reference to FIG. 10, the acceleration of scrolling is determined in accordance to the magnitude of amount-of-operation of the dragging operation. Also, the speed of scrolling of the display items is obtained taking into consideration the intended position of scrolling, obtained in accordance with scrolling acceleration.

Accordingly, in the event that the number of display items in the scrolling direction is smaller, the intended position of scrolling finally is fixed at the display item at the farthest end portion. In this case, the speed of scrolling is automatically made to gradually become slower.

That is to say, as shown in FIG. 13, in the section A up to position Z in which the intended position of scrolling can be moved in the scrolling direction in accordance with scrolling acceleration, the scrolling speed can be raised in accordance with the acceleration of scrolling.

However, in FIG. 13, we will say that the second B after position Z is a section wherein the remaining number of display items is small, the intended position of scrolling cannot be moved in the scrolling direction in accordance with scrolling acceleration, and the intended position of scrolling is fixed at the display item at the farthest end portion.

In this case, in section B, the scrolling speed of the display items is gradually made to be slower as a result. Accordingly, trouble can be in which the scrolling of display items is displayed to the shortest portion of the array of display items with the scrolling speed remaining fast, such that the display items at the shortest portion cannot be accurately confirmed, with dragging operations having to be performed in the backwards direction to confirm the display items again.

Note that in FIG. 11 through FIG. 13, description has been made of an example of a case in which an upwards dragging operation has been made as to the operating face of the input detection device 1 on the user interface region 101, as indicated by the arrow on the user interface region 101 in FIG. 11.

However, even in a case in which the direction of the dragging operation is performed downwards from the starting point, only the direction of scrolling of the display items changes, and scrolling of display items is performed in the same way as with the case of the dragging operation being performed upwards from the starting point.

[Conclusion of How to Obtain Scrolling Speed]

Figure 14:
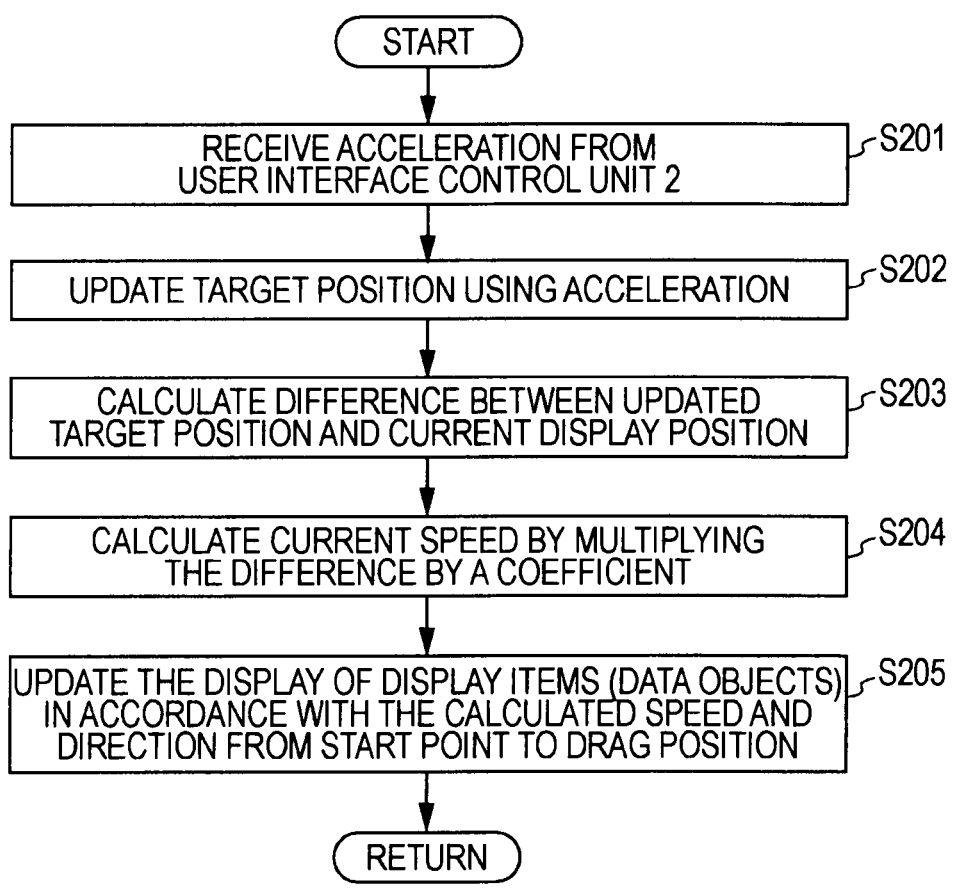
FIG. 14 is a flowchart for describing scrolling processing of display items performed at a data object control unit 3.

Next, we will conclude the scrolling processing of display items displayed in the item etc. display selection region 102, performed primarily at the data object control unit 3. FIG. 14 is a flowchart for describing the scrolling processing of display items performed at the data object control unit 3.

The processing illustrated in FIG. 14 is processing which is repeatedly performed at each predetermined timing primarily at the data object control unit 3 during a dragging operation being performed as to the operating face of the input detection device 1 in the user interface region 101.

First, as described above, the data object control unit 3 receives scrolling acceleration of the display items from the user interface control unit 2 (step S201). In this step S201, the data object control unit 3 also receives from the user interface control unit 2, for example, information indicating the direction of the dragging operation performed by the user and so forth, besides the scrolling acceleration.

The data object control unit 3 then updates the intended position of scrolling using the acceleration (step S202). Specifically, as described above, the intended position of scrolling this time is obtained by adding the acceleration this time to the intended position of scrolling the previous time.

Next, the data object control unit 3 calculates the difference between the updated intended position (intended position of scrolling this time) and the current display position of display items (head position of display items) (step S203).

The data object control unit 3 multiplies the difference obtained in step S203 by the predetermined coefficient, thereby calculating the speed at the current point-in-time (step S204). The processing in this step S203 and step S204 is the processing in Expression (1) described with reference to FIG. 12.

The data object control unit 3 then updates the display position of display items in the display memory unit 4, based on the speed of scrolling obtained in step S204, and the operation direction of the dragging operation from the user interface control unit 2 (step S205). The processing shown in FIG. 14 is then exited, and stands by till the next execution timing.

Accordingly, the display items displayed in the item etc. display selection region 102 can be scrolled in accordance with the dragging operations of the user.

[Control Processing of Intervals Between Boundary Symbols]

With the information processing device 100 according to the present invention, the display mode of boundary symbols to be displayed in the user interface region 101 is changed in accordance with dragging operations performed by the user, as described above.

Figure 15:
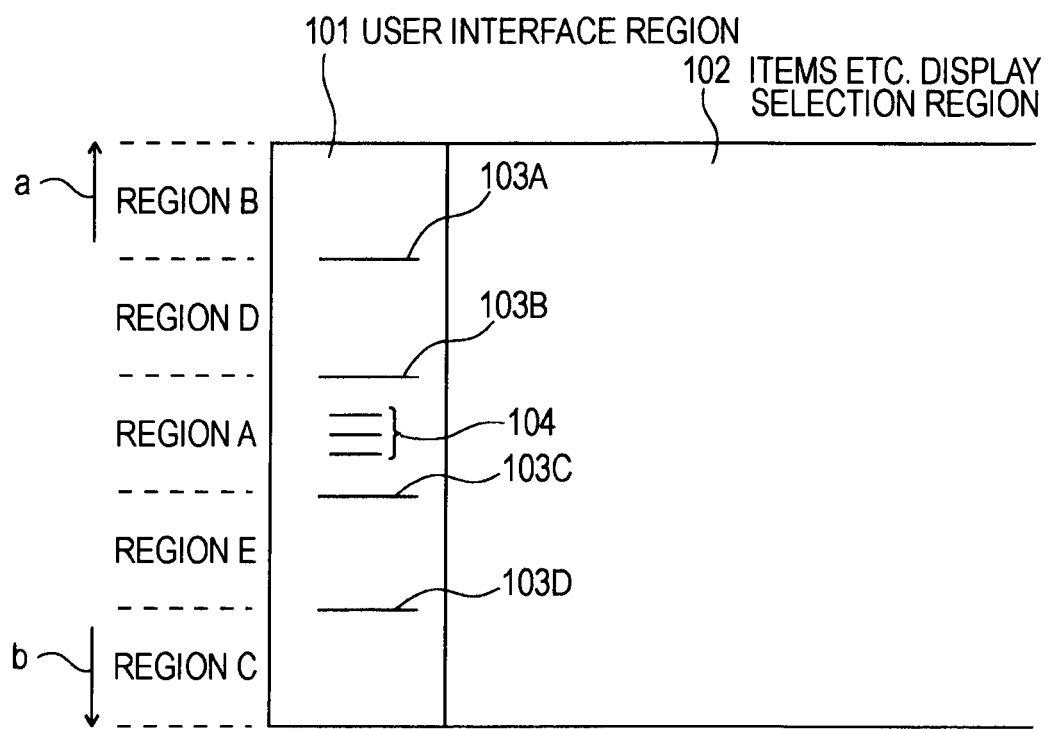
FIG. 15 is a diagram for describing an example of an initial display state (state before a dragging operation has been performed) of a boundary symbol.
Figure 16:
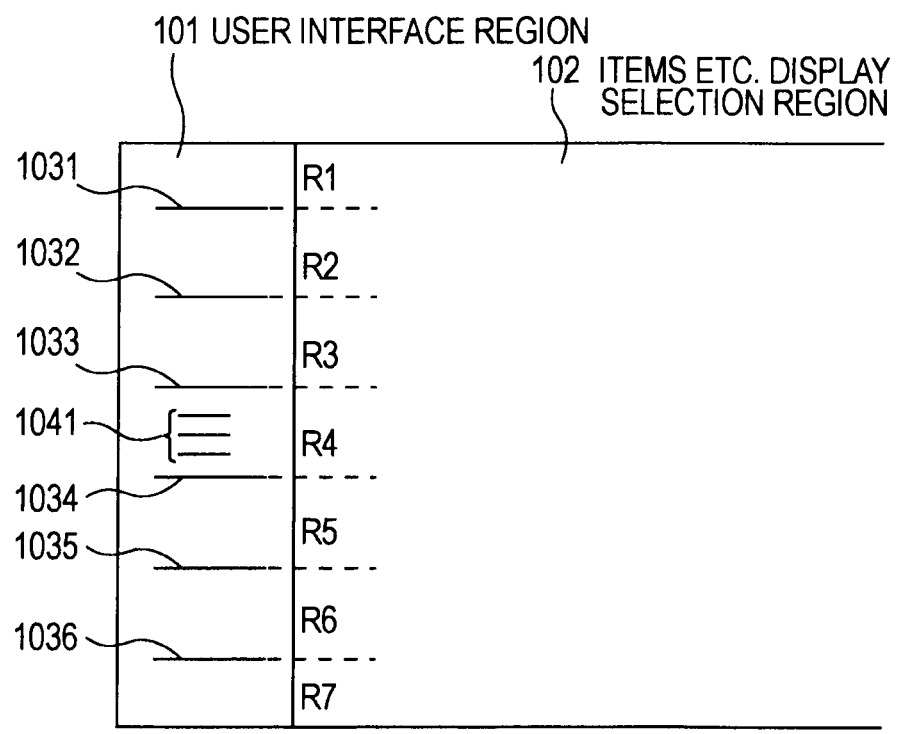
FIG. 16 is a diagram for describing an example of an initial display state (state before a dragging operation has been performed) of the boundary symbol.

FIG. 15 and FIG. 16 are diagrams for describing an example of an initial display state (state before a dragging operation has been performed) of the boundary symbols. As also illustrated with FIG. 2 through FIG. 7 and so forth, with the information processing device 100 according to the present embodiment, four line segments are used as boundary symbols to be displayed in the user interface region 101.

Note that this is but an example, and an arrangement may be made such as shown in FIG. 16 for example, where six line segments 1031, 1032, 1033, 1034, 1035, and 1036 are used as boundary symbols. In this case, the user interface region 101 is divided into seven regions indicated by R1 through R7.

In this way, using a great number of boundary symbols enables change in accordance with dragging operations of the user to be expressed in more detail. However, using too great a number of boundary symbols may result in the change in accordance with dragging operations becoming harder to see in some cases, so the number thereof is preferably a suitable one.

As also described above, with the information processing device 100, the intervals between boundary symbols are changed in accordance with dragging operations. In this case, as a first condition (principle), the interval between boundary symbols at the upper portion at the time of starting the dragging operation with the starting point S as a boundary, and between the upper edge portion of the display screen 5G and the boundary symbol closest to the upper edge portion, are a uniform interval α even while dragging. Also, the interval between boundary symbols at the lower portion at the time of starting the dragging operation with the starting point S as a boundary, and between the lower edge portion of the display screen 5G and the boundary symbol closest to the lower edge portion, are a uniform interval β even while dragging.

Specifically, with the case of the example described with reference to FIG. 2 through FIG. 4, the intervals between the upper edge portion of the display screen 5G and the boundary symbol 103A, and between the boundary symbol 103A and boundary symbol 103B, are a uniform interval α. Also, the intervals between the boundary symbol 103C and boundary symbol 103D, and between the boundary symbol 103D and the lower edge portion of the display screen 5G, are a uniform interval β.

This principle does not change while dragging as well, and the order of the upper edge portion of the display screen 5G, the boundary symbol 103A, boundary symbol 103B, boundary symbol 103C, boundary symbol 103D, and lower edge portion of the display screen 5G, does not change. The intervals in the tracing direction become narrower, so the interval α is controlled so as to become narrower than the interval β.

[Display Mode of User Interface Region After Ending Dragging Operation]

We will say that a dragging operation is performed on the operating face of the input detection device 1 in the user interface region 101 as described above, so as to scroll display items displayed in the item etc. display selection region 102, and the intended display item has been displayed.

In this case, the user ends the dragging operation by bringing into contact and releasing the finger as to the operating face of the input detection device 1 in the user interface region 101, from the operating face.

In the event that the dragging operation is ended in this way, with the information processing device 100, the user himself/herself can clearly know that the dragging operation has ended.

Figure 17:
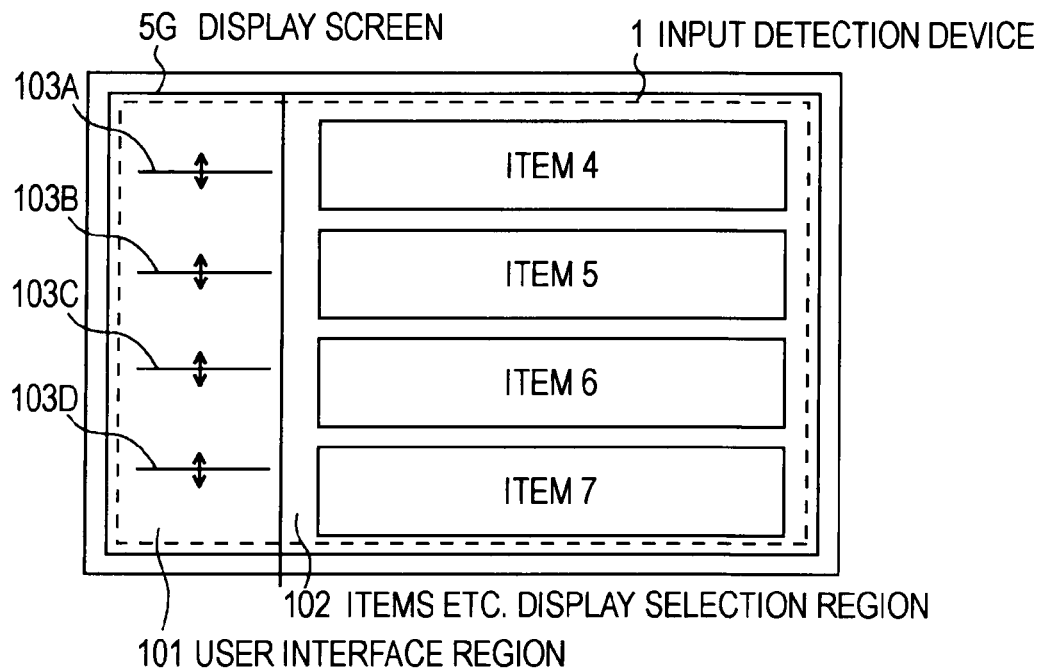
FIG. 17 is a diagram for describing an example of a display state of display information on a display screen 5G immediately after a dragging operation has been made to end.

FIG. 17 is a diagram for describing an example of a display state of display information in the display screen 5G immediately after the dragging operation having been ended. For example, as described with reference to FIG. 2 through FIG. 4, we will say that a dragging operation has been performed in the order of the dragging operation starting point S→dragging position E1→dragging position E2, the display items have been scrolled, and the intended display item has been displayed, so the dragging operation has been ended.

In this case, for example, at the dragging operation ending point-in-time, the display item at the upper edge of the item etc. display selection region 102 of which the entirety is displayed (item 4 in the case of the example in FIG. 4) is taken as the head display item, so that as shown in FIG. 17, four display items are displayed. Subsequently, scrolling of the display items in the item etc. display selection region 102 is stopped.

On the other hand, each of the boundary symbols 103A, 103B, 103C, and 103D in the user interface region 101 are made to return to their predetermined positions in the initial state before the dragging operation was performed. However, this is not simply returning to their predetermined positions in the initial stat.

As shown in FIG. 17, the boundary symbols 103A, 103B, 103C, and 103D each return to the initial state before the dragging operation was performed, and vibrate vertically as indicated by the arrows on the boundary symbols indicate.

With the information processing device 100 according to the present embodiment, stretching and shrinking of rubber is expressed in the user interface region 101 due to the display mode of boundary symbols in the user interface region 101 in accordance with the dragging operations of the user.

In the event of rubber which had been stretching and shrinking returning to the original state, there is vibration to a certain degree due to the energy at the time of the rubber being bulled back to its original state.

Accordingly, in order to express this state, the boundary symbols are made to vibrate vertically in the event that the dragging operation has ended and the positions of the boundary symbols are returned to their initial positions in the user interface region 101, so as to indicate that the shrunk state of rubber has been released.

Note that with the information processing device 100 according to the present embodiment, the vibration amplitude of the boundary symbols following ending of the dragging operation is controlled in accordance with the amount-of-operation of the dragging operation. That is to say, in the event that the amount-of-operation of the dragging operation is great, the vibration amplitude of the boundary symbols following the dragging operation is made to be great, and in the event that the amount-of-operation of the dragging operation is small, the vibration amplitude of the boundary symbols following the dragging operation is made to be small.

Figure 18:
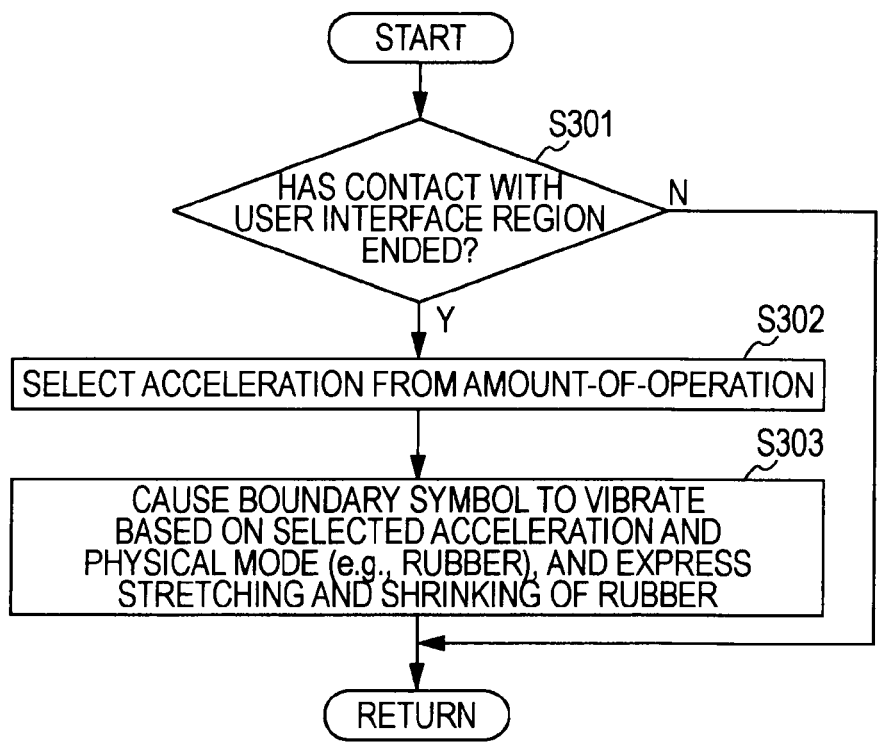
FIG. 18 is a flowchart for describing processing in a case of returning the display position of a boundary symbol in a user interface region 101 to the initial state.

FIG. 18 is a flowchart for describing processing in the case of returning the display positions of the boundary symbols in the user interface region 101 to the initial state in the case that a dragging operation has ended.

The processing shown in FIG. 18 is repeatedly executed at a suitable timing at the user interface control unit 2 after the user has started a dragging operation.

That is to say, upon a dragging operation being performed as to the operating face of the input detection device 1 in the user interface region 101, the user interface control unit 2 repeatedly executes the processing shown in FIG. 18 at a suitable timing.

The user interface control unit 2 also monitors the detection output from the input detection device 1 in the processing shown in FIG. 18, and determines whether or not contact of the user as to the operating face of the user interface region 101 has ended (step S301).

In the determining processing in step S301, in the event that determination is made that the contact of the user as to the operating face of the user interface region 101 has not ended, the processing shown in this FIG. 18 is exited, and stands by for the next execution timing.

In the determining processing in step S301, in the event that determination is made that the contact of the user as to the operating face of the user interface region 101 has ended, the acceleration to be used is selected based on the amount-of-operation of the dragging operation (step S302).

The processing in step S302 is to be used for vibrating the boundary symbols at the time of returning the boundary symbols to the positions in the initial state, in accordance with the amount-of-operation from the starting point of the dragging operation to the dragging position at the time of ending the dragging operation.

The user interface control unit 2 first returns the boundary symbols in the user interface region 101 to their positions in the initial state, and also causes the boundary symbols to vibrate according to the selected acceleration and a predetermined physical model (step S303).

While the physical model used in this step S303 is stretching and shrinking action of rubber for example, various other physical models may be used, such as stretching and shrinking action of a spring, for example.

The vibration of the boundary symbols in step S303 gradually converges, and finally the boundary symbols return to a still state at their positions in the initial state. Subsequently, the user interface control unit 2 ends the processing shown in FIG. 18, and in the event that a dragging operation is performed, repeatedly executes this.

Accordingly, in the case of performing a dragging operation, the user can confirm himself/herself that the state of the information processing device 100 has also made transition to a state in which the dragging operation has ended, by the display positions and vibration of the boundary symbols in the user interface region 101.

[Application of Flicking Operation]

With the above-described embodiment, an example has been described of a case in which a dragging operation is performed as to the operating face of the input detection device 1.

However, as described above, while there is difference in the speed of operations between a dragging operation and a flicking operation, these are operations performed by bringing a finger of the user or the like into contact with the operating face and then moving this on the operating face, and are operations which can be comprehended by the two types of information of distance of motion and direction of motion.

Accordingly, in the case of performing a flicking operation on the operating face of the input detection device 1 in the user interface region 101 as well, the display items displayed on the item etc. display selection region 102 can be made to be scrolled.

Figure 19:
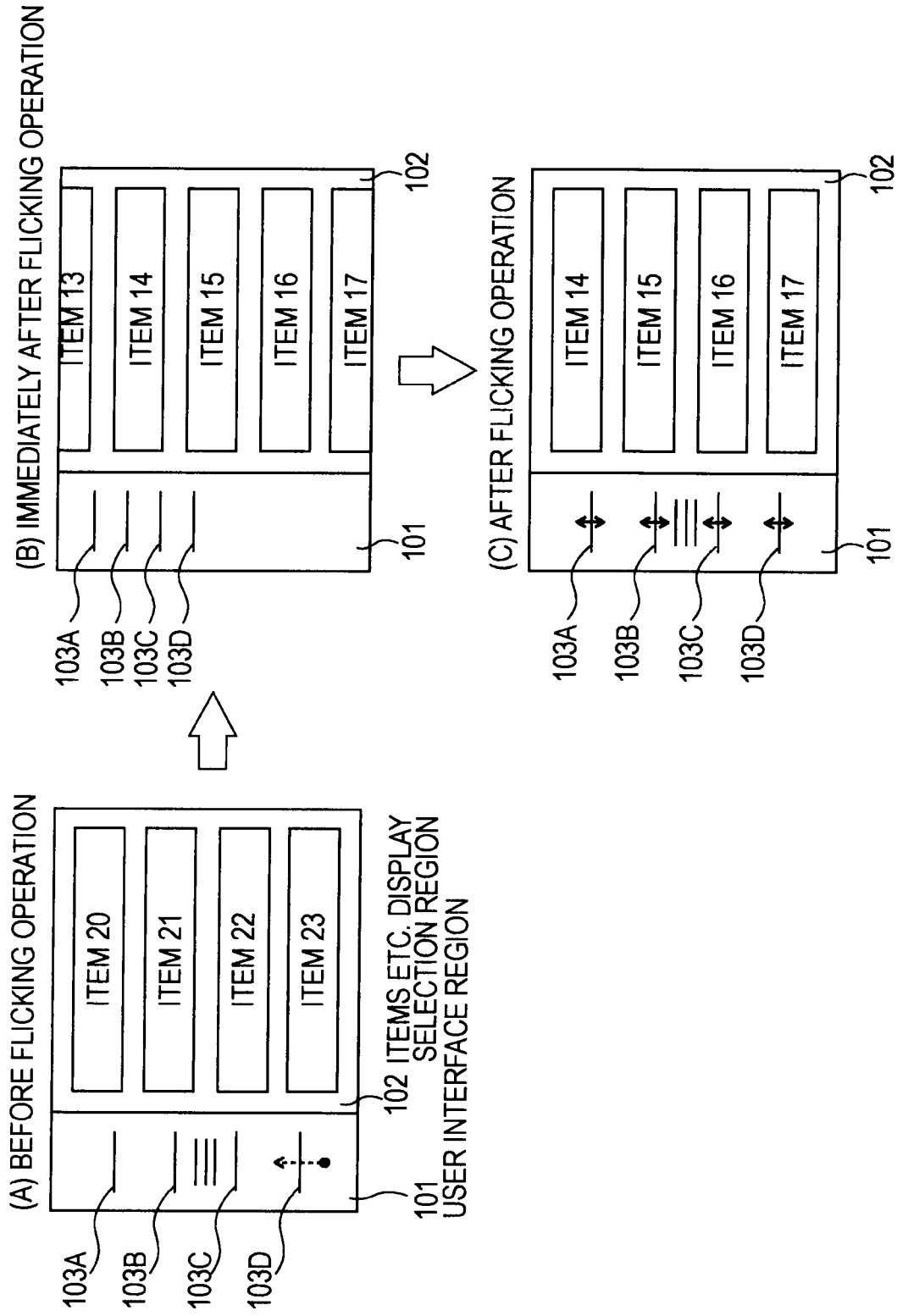
FIG. 19 is a diagram for describing scrolling display of display operations displayed in an item etc. display selection region 102 in the case of having performed a flicking operation.

FIG. 19 is a diagram for describing scrolling display of display items displayed in the item etc. display selection region 102 in the case of having performed a flicking operation as to the operating face of the input detection device 1 in the user interface region 101.

FIG. 19(A) is a diagram for describing the display state of the display screen 5G before a flicking operation is performed as to the operating face of the input detection device 1 in the user interface region 101.

As shown in FIG. 19(A), the boundary symbols and the like are displayed at their positions in the initial state before a dragging operation or flicking operation is performed, in the user interface region 101. Also, four display items from item 20 through item 23 are displayed in the item etc. display selection region 102 in the same way as with the case shown in FIG. 2, in a state capable of being scrolled both up and down.

We will now say that a flicking operation has been performed upwards (in the direction toward the upper edge) of the display screen 5G, as indicated by the dotted arrow from the lower side portion of the user interface region 101 in FIG. 19.

As described above, a flicking operation is made by the user bringing a finger or the like into contact with the operating face of the input detection device 1 and then quickly "flicking" this in an intended direction. Accordingly, the time contact of the finger or the like of the user as to the operating face of the input detection device 1 much shorter as compared to a dragging operation.

Accordingly, as shown in FIG. 19(B), immediately after a flicking operation has been performed, the display mode of the boundary symbols within the user interface region 101 is changed in accordance with the starting position of the flicking operation and the operating direction and amount-of-operation. At the same time, as shown in FIG. 19(B), the display items in the item etc. display selection region 102 are scrolled in accordance with the direction of operation and amount-of-operation of the flicking operation.

In this case, the change of the display mode of the boundary symbols in the user interface region 101 can be performed in the same way as with the case of the above-described dragging operation. That is to say, the amount-of-operation of the flicking operation can be comprehended in accordance from the starting point to the ending point of contact with the finger or the like of the user, with the case of a flicking operation as well. Also, the amount-of-operation of the flicking operation can be comprehended in accordance with the time from the starting point to the ending point of contact with the finger or the like of the user.

However with the case of a flicking operation, the amount of time of the contact state as to the operating face of the input detection device 1 is extremely short. Accordingly, in the case of the flicking operation, the amount-of-operation may be a predetermined amount.

As described above, the contact state as to the operating face of the input detection device 1 is extremely short. Accordingly, after performing the display such as shown in FIG. 19(B) in accordance with the flicking operation, the display state of the boundary symbols in the user interface region 101 is speedily returned to the initial state, and also scrolling of the item etc. display selection region 102 is stopped.

That is to say, after changing the display state as shown in FIG. 19(B), the display positions of the boundary symbols in the user interface region 101 are returned to the positions of the initial state as shown in FIG. 19(C), and the boundary symbols are made to vibrate vertically.

The processing for causing the boundary symbols to vibrate is performed in the same way as the case described with reference to FIG. 17 and FIG. 18.

Also, after changing the display as shown in FIG. 19(B), the scrolling of the display items in the item etc. display selection region 102 is stopped as shown in FIG. 19(C). In this case, after executing scrolling of the display items by an amount corresponding to the flicking operation, the display item at the upper edge of the item etc. display selection region 102 of which the entirety is displayed is taken as the head display item, so that as shown in FIG. 19(C), four display items are displayed.

Thus, the display mode of the boundary symbols in the user interface region 101 can be changed in accordance with the direction of operation and the amount-of-operation of the flicking operation even in a case wherein a flicking operation is performed instead of a dragging operation. At the same time, the display items in the item etc. display selection region 102 can be performed in accordance with the direction of operation and amount-of-operation of the flicking operation.

[Processing at Time of Accepting Flicking Operation at Information Processing Device 100]

Figure 20:
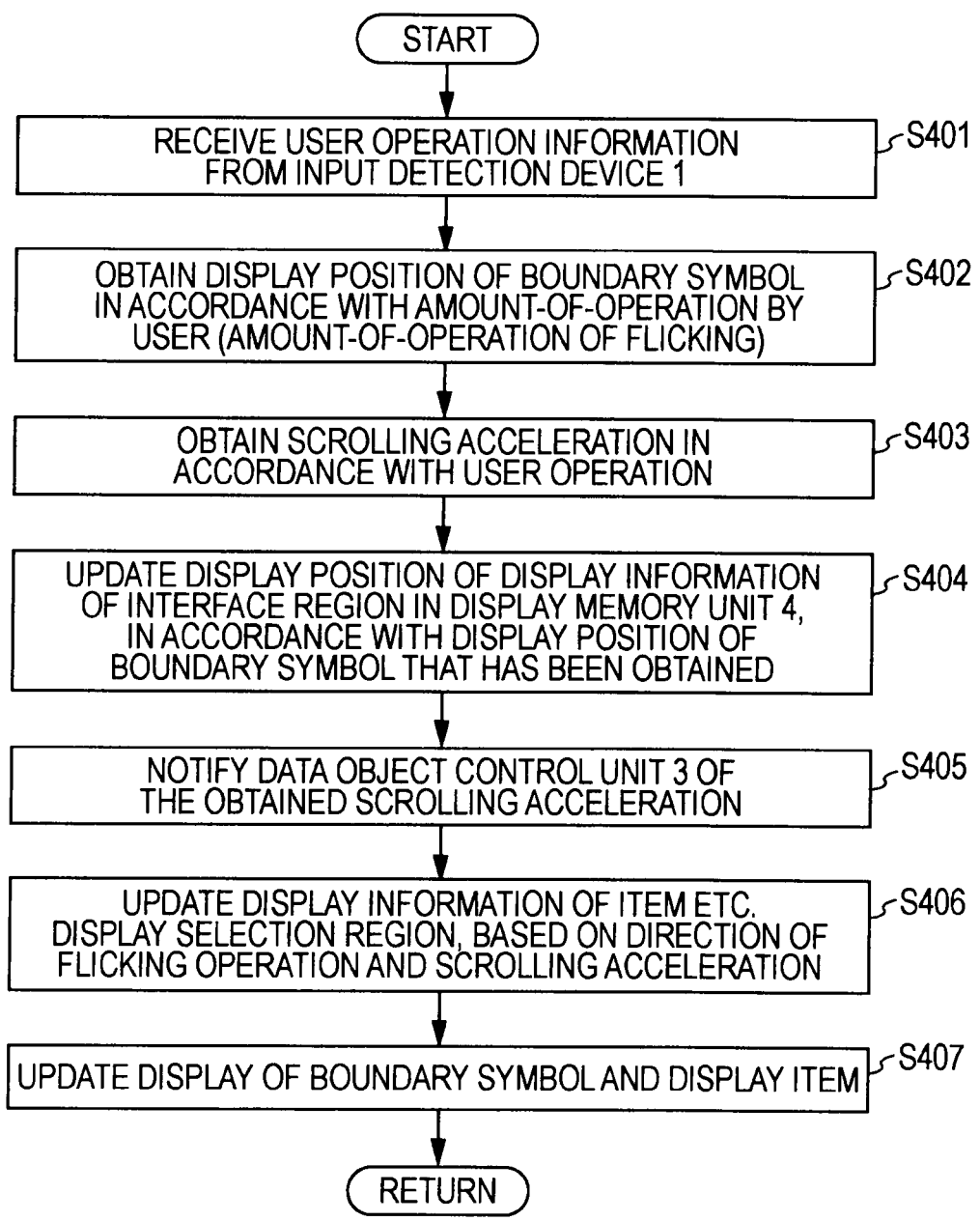
FIG. 20 is a flowchart for describing processing at the time of a flicking operation performed at the information processing device 100.

FIG. 20 is a flowchart for describing processing performed at the information processing device 100 according to the present embodiment at the time of a flicking operation.

The processing shown in FIG. 20 is performed in the event that the power is turned on to the information processing device 100, and a flicking operation is performed as to the operating face of the input detection device 1 in the user interface region 101. The processing shown in this FIG. 20 primarily is executed by the user interface control unit 2 and data object control unit 3.

That is to say, upon a flicking operation being performed as to the operating face of the input detection device 1 in the user interface region 101, the user interface control unit 2 and the data object control unit 3 cooperatively execute the processing shown in FIG. 20.

First, the user interface control unit 2 accepts the user operation information from the input detection device 1 (step S401). Here, the user operation information is coordinate data corresponding to the operating face of the input detection device 1 that changes in accordance to the flicking operation.

The user interface control unit 2 calculates the user amount-of-operation (flicking amount-of-operation) in accordance with the received user operation information, and obtains the display position of the boundary symbols corresponding to the user amount-of-operation (step S402).

As described above, the user amount-of-operation (flicking amount-of-operation) can be obtained as the difference between the starting point of the flicking operation (flicking starting point) and ending point of the flicking operation (flicking ending point).

Also, the user amount-of-operation (flicking amount-of-operation) can be obtained as the time from the starting point of the flicking operation (flicking starting point) to the ending point of the flicking operation (flicking ending point).

In the case of this example, in step S402, where the display positions of the boundary symbols should be, can be identified based on the position of the flicking operation starting point on the user interface region 101, the direction of the flicking operation with the starting point as a reference, and the amount-of-operation of the flicking operation (user amount-of-operation).

For example, the display positions of boundary symbols are stored and held in the coefficient and data storage unit 6, with the three types of information of the position of the starting point of the flicking operation on the user interface region 101, the direction of the flicking operation with the starting point as a reference, and the amount-of-operation of the flicking operation, in a correlated manner.

The user interface control unit 2 makes reference to the coefficient and data storage unit 6 based on the information obtained as described above, and thereby can identify the display position of the boundary symbols on the user interface region 101.

Further, the user interface control unit 2 obtains the acceleration for scrolling in the case of scrolling the display items, in accordance with the user amount-of-operation (flicking operation) (Step S403). In the processing in this step S403 as well, the acceleration of scrolling can be uniquely identified corresponding to the amount-of-operation of the flicking operation.

More specifically, for example, the coefficient and data storage unit 6 stores and holds scrolling acceleration correlated with the amount-of-operation of the flicking operation. The corresponding acceleration data is then read out from a predetermined area in the coefficient and data storage unit 6, based on the obtained amount-of-operation of the flicking operation. Thus, the scrolling acceleration can be obtained in accordance with the amount-of-operation of the flicking operation.

Subsequently, the user interface control unit 2 updates the display positions of the boundary symbols in the user interface region 101, stored and held in the display memory unit 4, based on the obtained display positions of the boundary symbols (step S404).

Also, the user interface control unit 2 notifies the data object control unit 3 of the direction of the flicking operation and the obtained scrolling acceleration (step S405).

The data object control unit 3 updates the display information of the item etc. display selection region 102 (display position of display items) in the display memory unit 4, in accordance with the direction of the flicking operation and scrolling acceleration from the user interface control unit 2 (step S406).

Subsequently, the display device 5 displays the updated display information (boundary symbols and display items (data objects) in the display memory unit 4, on the display screen of its own display device (Step S407). The processing shown in this FIG. 20 then ends, and stands by for the next flicking operation.

Thus, the correlation of display of the boundary symbols in the user interface region 101 can be changed, and also display items (data objects) displayed in the item etc. display selection region 102 can be subjected to scrolling display, in accordance with flicking operations of the user.

[Another Example of Display Transition Corresponding to Dragging Operation]

Next, another example of a display mode of boundary symbols in the user interface region 101 in accordance with a dragging operation will be described. In the above-described embodiment, the intervals formed between boundary symbols situated above a starting point S of a dragging operation at the time of starting of the dragging serving as a reference, and boundary symbols situated below, are made to differ. However, this is not restricted to this.

For example, an arrangement may be made wherein the display position of each of the boundary symbols 103A, 103B, 103C, and 103D changes, so that the intervals between the boundary symbols change. FIG. 21 through FIG. 27 are diagrams for describing another example of a display mode of information displayed on the display screen of the display device 5, making transition in accordance with dragging operations, with the information processing device 100.

A case of starting dragging operations from the middle portion of the user interface region 101 will be described with reference to FIG. 21 through FIG. 26.

Figure 21:
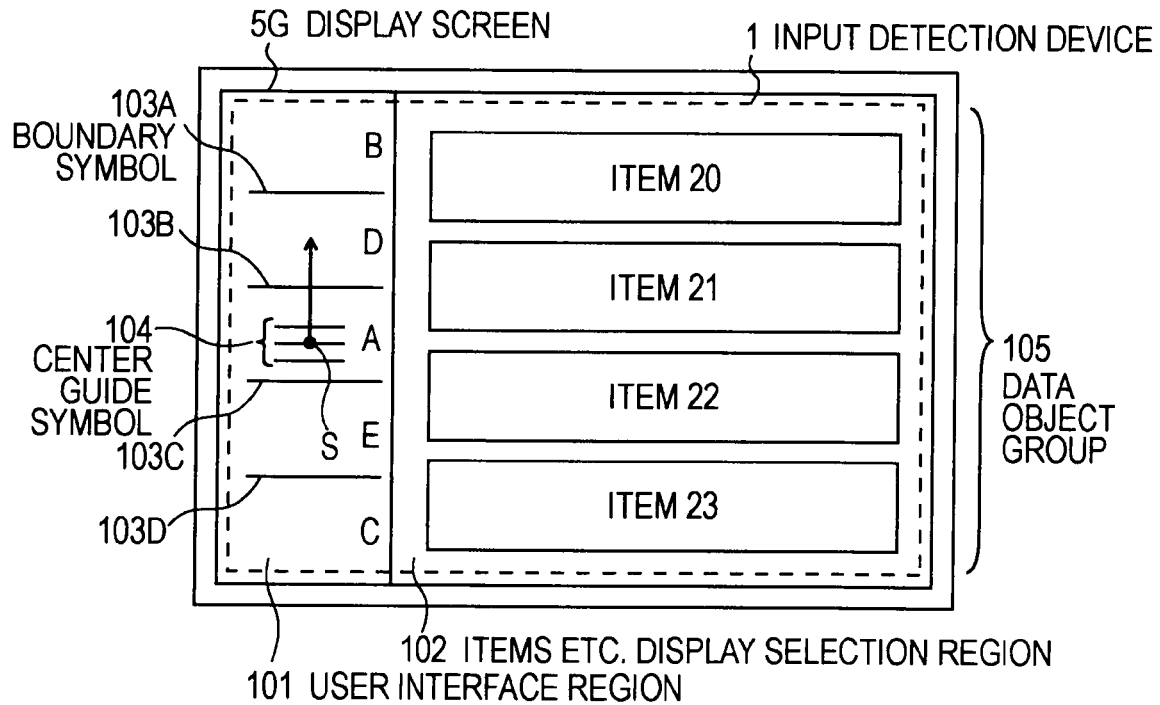
FIG. 21 is a diagram for describing another example of a display mode of information displayed on the display screen of a display device 5, which makes transition in accordance with a dragging operation.

FIG. 21 illustrates a state the same with the case of FIG. 2 described above, and is a diagram for describing the display state of information displayed in the display screen 5G of the display device 5 before a dragging operation having been performed as to the input detection device 1 at the information processing device 100.

In the case of this example as well, the user interface region 101 is divided into five portions by four boundary symbols 103A, 103B, 103C, and 103D, which are line segments, as shown in FIG. 21.

With the present embodiment, the boundary symbols 103A, 103B, 103C, and 103D are normally (when no dragging operation is being performed) displayed in the vertical direction of the user interface region 101 so as to divide equally into five regions.

In the case of the present embodiment, a center guide symbol 104, which is three line segments indicating the center, is displayed at the center portion in the vertical direction of the user interface region 101 between the boundary symbol 103B and boundary symbol 103C.

Also, a display item group (data object group) 105 is displayed in the item etc. display selection region 102. In the present embodiment, four display items (data objects) are displayed within the item etc. display selection region 102. With the example in FIG. 21, of the display items of this there are 100 items, the 20th through the 23rd display items are displayed indicating that scrolling can be performed in both the up and down directions.

Then, as shown in FIG. 21, we will say that the user has brought a finger or the like into contact with the operating face of the input detection device 1 at the position where the center guide symbol 104 of the user interface region 101 is displayed, and started a dragging operation in the direction indicated by the arrow. In this example, the position indicated by the symbol S is the start point where the user has first brought the finger or the like into contact.

Figure 22:
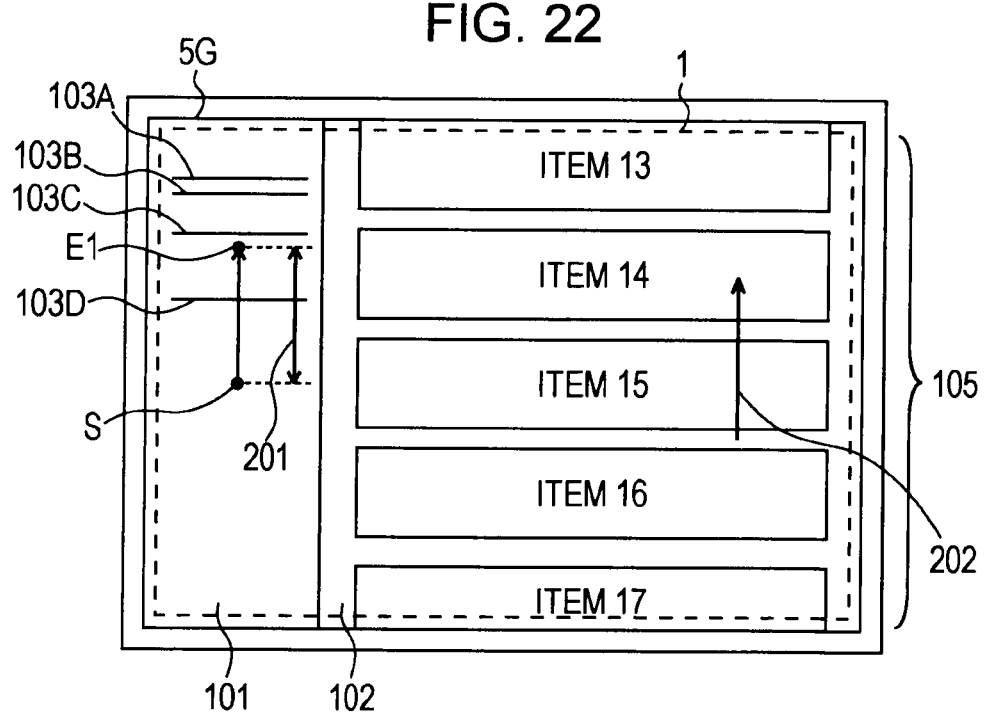
FIG. 22 is a diagram for describing another example of a display mode of information displayed on the display screen of a display device 5, which makes transition in accordance with a dragging operation.

FIG. 22 is a diagram for describing a display state of information displayed in the display screen 5G of the display device 5 immediately after the dragging operation has started in the direction indicated by the arrow in FIG. 21, from the state before starting of the dragging operation shown in FIG. 21.

Upon a dragging operation being performed on the operating face of the input detection device 1 on the user interface region 101, coordinate data corresponding to the contact position on the operating face of the input detection device 1 which changes in accordance to the dragging operation performed by the user, is output from the input detection device 1.

The coordinate data from the input detection device 1 is supplied to the user interface control unit 2. The user interface control unit 2 comprehends the direction of the dragging operation of the user and the amount-of-operation based on the coordinate data from the input detection device 1. The user interface control unit 2 then changes the display position of the boundary symbols in the user interface region 101 in the display memory unit 4 following the comprehended contents.

As shown in FIG. 22, in the case of this example, each of the boundary symbols 103A, 103B, 103C, and 103D have their positions moved in the direction of the dragging operation as compared to the case shown in FIG. 21.

Also, as shown in FIG. 22, the intervals between the boundary symbols 103A, 103B, 103C, and 103D are compressed such as a pattern created in the case of rubber shrinking, as shown in FIG. 22, thereby allowing the user to intuitively recognize the amount-of-operation of the dragging operation.

That is to say, in FIG. 22, the starting point of the dragging operation is indicated by the position S, and the current dragging position is indicated by position E1. The operation direction in this case is the direction upwards as to the display screen 5G, as indicated by the solid arrow from the starting point S to the current dragging position E1.

Also, the amount-of-operation of the dragging operation in this case corresponds to the difference between the starting point S to the current dragging position E1, and accordingly is the size indicated by a two-ended arrow 201 shown in FIG. 22.

Accordingly, the user interface control unit 2 controls the display memory unit 4 to move positions of each of the boundary symbols in the user interface region 101 in the display memory unit 4 in accordance with the amount-of-operation of the dragging operation and the direction of operation thereof. In the case of the example shown in FIG. 22, between the boundary symbols 103A and 103B, between the boundary symbols 103B and 103C, and between the boundary symbols 103C and 103D, are each made to be different.

In the case of the example shown in FIG. 22, the user interface control unit 2 makes the intervals between boundary symbols to be narrower, the closer they are to the edge portion of the operating face of the input detection device 1 in the direction of the dragging operation which is determined in accordance with the current dragging position E1 as to the starting point S of the dragging operation.

In the case shown in FIG. 22, the direction of the dragging operation is the direction from the starting point S toward the current dragging position E1 on the display screen 5G (upward direction on the display screen 5G), as described above.

Accordingly, the edge portion of the operating face of the input detection device 1 in the direction of the dragging operation is the upper edge of the display screen 5G in the case of the example shown in FIG. 22. In the case of the example shown in FIG. 22, the intervals between boundary symbols are made to be narrower the closer they are to the upper edge of the display screen 5G.

Accordingly, with the case of the example shown in FIG. 22, between the boundary symbols 103A and 103B is the narrowest, between the boundary symbols 103B and 103C is the second narrowest, and between the boundary symbols 103C and 103D is the third narrowest.

In other words, the intervals between the boundary symbols gradually becomes wider in the order of between the boundary symbols 103A and 103B→between the boundary symbols 103B and 103C→between the boundary symbols 103C and 103D.

Note that in this case, scrolling display of the display items displayed in the item etc. display selection region 102 is the same as the case described with reference to FIG. 2 through FIG. 5 and FIG. 9 through FIG. 14.

Further continuing the dragging operation from the state shown in FIG. 22 then enables changing of the acceleration of the scrolling of the display items to be displayed in the item etc. display selection region 102. In this case, the intervals between the boundary symbols is further changed.

Figure 23:
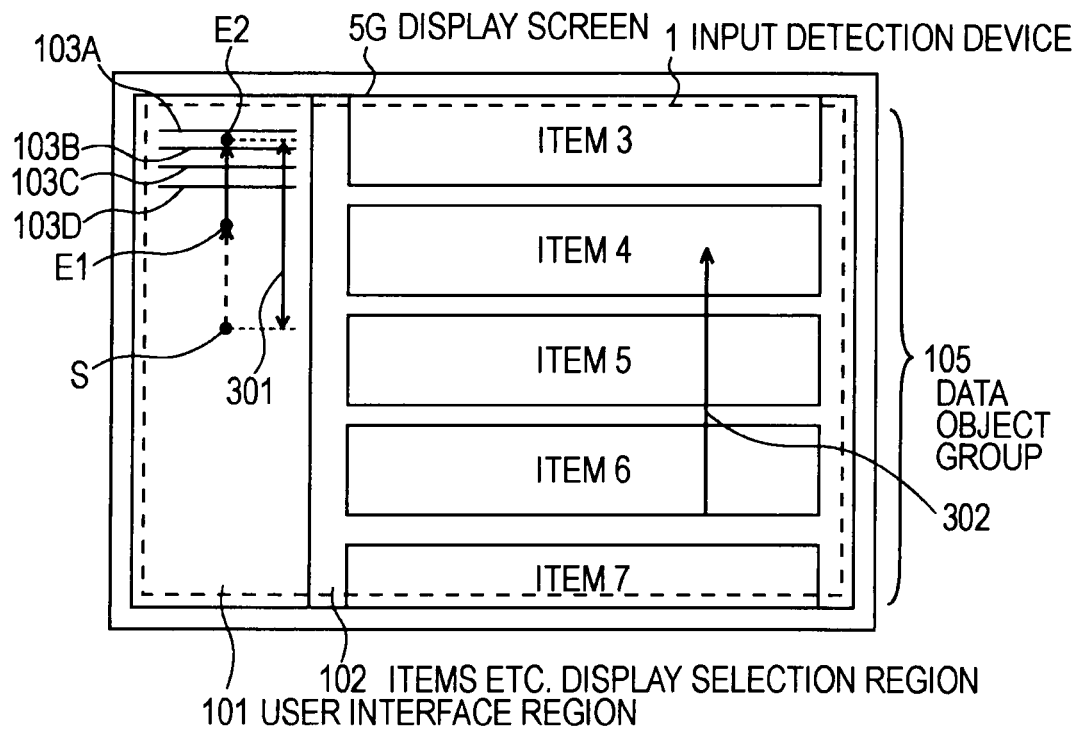
FIG. 23 is a diagram for describing another example of a display mode of information displayed on the display screen of a display device 5, which makes transition in accordance with a dragging operation.

FIG. 23 is a diagram for describing the display state of information displayed in the display screen 5G of the display device in a case of a dragging operation being further performed from the dragging position E1 shown in FIG. 22.

In FIG. 23, let us say that a dragging operation has further been performed from the dragging position E1, such that a dragging operation is performed to a dragging position E2, as indicated by the arrow from the position E1 to the position E2. In this case, the newly-performed dragging operation is from the dragging position E1 to the current dragging position E2.

However, the amount-of-operation of the dragging operation indicated by the difference between the starting point S of the dragging operation to the current dragging position E2 is great as compared to the two-ended arrow 201, as indicated by the two-ended arrow 301 in FIG. 23.

The user interface control unit 2 then controls the display memory unit 4 based on the direction of dragging operation, and the amount-of-operation of the newest dragging operation indicated by the two-ended arrow 301, and changes the positions of the boundary symbols 103A, 103B, 103C, and 103D.

In this case, the amount-of-operation of the dragging operation is even greater from the state shown in FIG. 22, as can be seen by comparing the two-ended arrow 201 shown in FIG. 22 and the two-ended arrow 301 shown in FIG. 23. Accordingly, in the event that the dragging operation is continued in the same direction, from the state shown in FIG. 22 to the state shown in FIG. 23, the interval between boundary symbols is even denser.

Accordingly, the user can accurately tell in which side he/she is performing a dragging operation, and how the information processing device 100 is recognizing this state, in accordance with the display mode of the boundary symbols in the user interface region 101.

Also, with the information processing device 100 according to the present embodiment, continuous dragging operations can be performed from anywhere on the user interface region 101.

Figure 24:
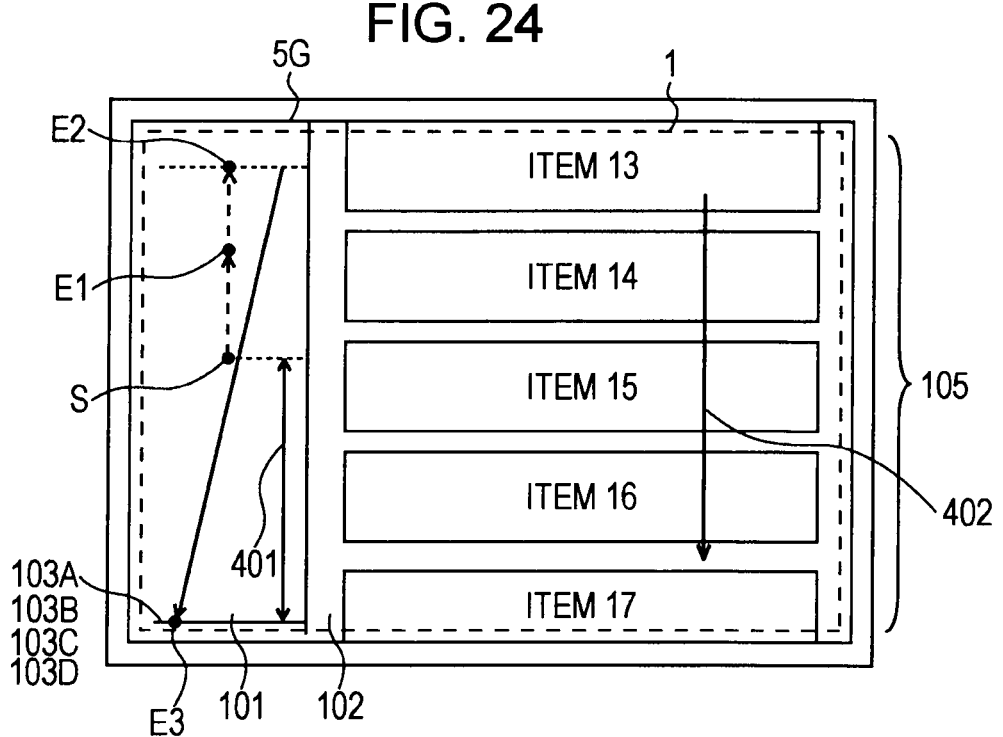
FIG. 24 is a diagram for describing another example of a display mode of information displayed on the display screen of a display device 5, which makes transition in accordance with a dragging operation.

FIG. 24 is a diagram for describing a display state of information displayed on the display screen 5G of the display device 5 in the event that a great dragging operation has been performed from the dragging position E2 shown in FIG. 23 in a direction opposite to that so far.

As described with reference to FIG. 21, FIG. 22, and FIG. 23, we will say that the dragging operation has been performed in the manner of starting point S→position E1→position E2. We will then say that, as shown in FIG. 24, after the current dragging position has reached the position E2, a large dragging operation is performed from the upper right of the user interface region 101 to the lower left thereof, without the finger or the like in contact with the operating face of the input detection device 1 therein ever having left the face thereof.

In this case as well, the display positions of the boundary symbols in the user interface region 101 are also changed based on the direction of the dragging operation and the amount-of-operation of the dragging operation. At the same time, the display items displayed in the item etc. display selection region 102 also have a scrolling display made thereof, based on the acceleration determined according to the direction of the dragging operation and the amount-of-operation of the dragging operation.

In this case, during the time of the operating position of the dragging operation reaching the starting point S from the position E2, the intervals between the boundary symbols in the user interface region 101 gradually become wider. Upon the dragging position returning to the starting point S of the dragging operation, the boundary symbols in the user interface region 101 return to the display state shown in FIG. 21.

Upon the dragging operation being further continued, and the dragging position being situated below the starting point S in the display screen 5G, the direction of the dragging operation is downwards as to the display screen 5G, so the amount-of-operation of the dragging operation gradually increases.

In this case, then, the boundary symbols 103A, 103B, 103C, and 103D, in the user interface region 101, each move in the direction of the dragging operation, i.e., in the direction toward the lower edge portion of the display screen 5G.

In this case, the display position of each of the boundary symbols 103A, 103B, 103C, and 103D, is changed, so that the intervals between the boundary symbols change. That is to say, between the boundary symbols 103A and 103B, between the boundary symbols 103B and 103C, and between the boundary symbols 103C and 103D, are each made to differ.

In the case of the example shown in this FIG. 24 as well, the user interface control unit 2 makes the intervals between boundary symbols to be narrower, the closer they are to the edge portion of the operating face of the input detection device 1 in the direction of the dragging operation which is determined in accordance with the current dragging position as to the starting point S of the dragging operation.

In the case shown in FIG. 24, the direction of the dragging operation is the downward direction on the display screen 5G, as indicated by the solid arrow heading from the upper right to the lower left in FIG. 24. Accordingly, the edge portion of the operating face of the input detection device 1 in the direction of the dragging operation is the lower edge of the display screen 5G in the case of the example shown in FIG. 24. In the case of the example shown in FIG. 24, the intervals between boundary symbols are made to be narrower the closer they are to the lower edge of the display screen 5G.

Accordingly, with the case of the example shown in FIG. 24, between the boundary symbols 103D and 103C is the narrowest, between the boundary symbols 103C and 103B is the second narrowest, and between the boundary symbols 103B and 103A is the third narrowest.

In other words, the intervals between the boundary symbols gradually becomes wider in the order of between the boundary symbols 103D and 103C→between the boundary symbols 103C and 103B→between the boundary symbols 103B and 103A.

As the dragging position becomes closer to the lower edge portion of the display screen 5G, the amount-of-operation of the dragging operation becomes greater, so the intervals between the boundary symbols are gradually narrowed. Finally, the boundary symbols 103A, 103B, 103C, and 103D are each displayed overlaid on the same position, as shown in FIG. 24.

Accordingly, displaying the intervals between the boundary symbols displayed in the user interface region 101 differently according to dragging operations allows the user to be notified of the direction of the dragging operation and the amount-of-operation of the dragging operation by the intervals thereof.

Note that control may be made wherein, in the event of dragging from the lower edge portion of the user interface region 101, or conversely from the upper edge portion, as shown in FIG. 6, the intervals between the boundary symbols situated in the direction of the dragging operation from the starting point of the dragging operation are at equal intervals.

The following is a description of an example of a case of performing control of intervals between boundary symbols, described with reference to FIG. 21 through FIG. 24. In the following, description will be made regarding an example of a case of using the boundary symbols 103A, 103B, 103C, and 103D, which are four line segments, as also illustrated with FIG. 21 and also FIG. 15.

As shown in FIG. 15, and also shown in FIG. 21, in this example, a region between the boundary symbols 103B and 103C is a region A, and a region between the upper edge of the user interface region 101 and the boundary symbol 103A is a region B. Also, a region between the boundary symbols 103A and 103B is a region D.

Also, as shown in FIG. 15, and also shown in FIG. 21, a region between the lower edge of the user interface region 101 and the boundary symbol 103D is a region C, and a region between the boundary symbols 103C and 103D is a region E. Also, in the following, the direction indicated by the arrow a is described as the upward direction, and the direction indicated by the arrow b as the downward direction.

Now, with the information processing device 100 according to the present embodiment, the intervals between the boundary symbols are controlled in accordance with the position of the starting point of the dragging operation and the direction of the dragging operation, and the amount-of-operation of the dragging operation.

Specifically, the intervals between the boundary symbols can be controlled using a correlation table such as shown in FIG. 25 and FIG. 26, for example. That is to say, FIG. 25 and FIG. 26 are diagrams for describing a correlation table correlating how to control the intervals between the boundary symbols, in accordance with the position of the starting point of the dragging operation and the direction of the dragging operation on the user interface region 101, and the amount-of-operation of the dragging operation.

In FIG. 25 and FIG. 26, the dragging start region column shows the region of the position of the starting point of the dragging operation. Also, the dragging operation direction indicates the current direction of the dragging position (direction of dragging operation) as to the starting point of the dragging operation.

In FIG. 25 and FIG. 26, the amount-of-operation (ratio) column shows the amount-of-operation of the dragging operation. In FIG. 25, the x1 through xn in the amount-of-operation (ratio) column is the amount-of-operation of the dragging operation (amount-of-operation from the starting point of the dragging operation to the dragging position), and in the case of this example, has a relation of $x1<x2<x3<x4<\ldots<xn$.

Also, in 25 and FIG. 26, the amount-of-operation (ratio) column shows the range of the amount-of-operation of the dragging operation. That is to say, in the amount-of-operation (ratio) column, "≤x1" indicates a range which is "0<amount-of-operation≤x1", and "≤x2" indicates a range which is "x1<amount-of-operation≤x1". "≤x3" indicates a range which is "x2<amount-of-operation≤x3", and "≤x4" indicates a range which is "x3<amount-of-operation≤x4". Also, "≤x2" indicates a range which is "xn−1<amount-of-operation≤xn".

Also, in FIG. 25 and FIG. 26, the head symbol position shows the head boundary symbol (direction of motion of the boundary symbol) and the position of the head boundary symbol in the user interface region 101.

Note that in the head symbol position column in FIG. 25 and FIG. 26, the positions y1, y2, ..., yn indicate positions to the upper edge side of the user interface region 101, and the positions yy1, yy2, ..., yyn indicate positions to the lower edge side of the user interface region 101.

Also, in FIG. 25 and FIG. 26, the symbol interval sections indicates the control sections of intervals between the boundary symbols, i.e., whether to make the intervals between the boundary symbols not uniform or uniform.

Also, in FIG. 25 and FIG. 26, the symbol interval 1, symbol interval 2, and symbol interval 3 each indicate the magnitude of intervals between the boundary symbols. The symbol interval 1 corresponds to between boundary symbols situated at the farthest edge in the dragging operation direction in the user interface region 101. The symbol interval 2 corresponds to between boundary symbols next to the symbol interval 1, and the symbol interval 3 corresponds to between boundary symbols next to the symbol interval 2.

For example, in the example shown in FIG. 21, let us say that a starting point of a dragging operation is provided by bringing a finger or the like into contact with one of the regions A, B, or D, at or above the region A, and then a dragging operation is performed in the upward direction (the direction indicated by the arrow a in FIG. 15) with the finger still in contact.

In this case, only two boundary symbols at the most exist in the direction of the dragging operation from the starting point of the dragging operation. Accordingly, in FIG. 25, the dragging starting region is one of the regions A, B, or D, and the display positions of the boundary symbols are controlled in accordance with the amount-of-operation of the dragging operation.

In this case, the boundary symbol 103A is the head boundary symbol as shown in FIG. 25, and control is performed such that the display positions of the boundary symbols are changed in the upward direction in FIG. 21.

The display position of the head boundary symbol 103A is made to be a position in the user interface region 101 indicated by value y1, y2, .... The intervals of the boundary symbols are the controlled by the values indicated by the symbol interval 1, symbol interval 2, and symbol interval 3.

In this case, the intervals are made wider in the order of (1) between the boundary symbols 103A and 103B→ (2) between the boundary symbols 103B and 103C→ (3) between the boundary symbols 103C and 103D.

As can be understood from the information of the symbol interval 1, symbol interval 2, and symbol interval 3, in FIG. 25, the intervals between the boundary symbols gradually become smaller as the amount-of-operation of the dragging operation becomes greater.

Accordingly, in this case, the boundary symbols gradually move to the upper edge side of the user interface region 101, and finally the intervals become 0 (zero) and the four boundary symbols are displayed overlaid on the same position.

Also, in the example shown in FIG. 21, let us say that a starting point of a dragging operation is provided by bringing a finger or the like into contact with one of the regions A, C, or E, at or below the region A, and then a dragging operation is performed in the downward direction (the direction indicated by the arrow b in FIG. 15) with the finger still in contact.

In this case, only two boundary symbols at the most exist in the direction of the dragging operation from the starting point of the dragging operation. Accordingly, in FIG. 25, the dragging starting region is one of the regions A, C, or E, and the display positions of the boundary symbols are controlled in accordance with the amount-of-operation of the dragging operation.

In this case, the boundary symbol 103D is the head boundary symbol as shown in FIG. 25, and control is performed such that the display positions of the boundary symbols are changed in the downward direction in FIG. 21.

The display position of the head boundary symbol 103D is made to be a position in the user interface region 101 indicated by value yy1, yy2, .... The intervals of the boundary symbols are the controlled by the values indicated by the symbol interval 1, symbol interval 2, and symbol interval 3.

In this case, the intervals are made wider in the order of (1) between the boundary symbols 103D and 103C→ (2) between the boundary symbols 103C and 103B→ (3) between the boundary symbols 103B and 103A.

As can be understood from the information of the symbol interval 1, symbol interval 2, and symbol interval 3, in FIG. 25, the intervals between the boundary symbols gradually become smaller as the amount-of-operation of the dragging operation becomes greater.

Accordingly, in this case, the boundary symbols gradually move to the lower edge side of the user interface region 101, and finally the intervals become 0 (zero) and the four boundary symbols are displayed overlaid on the same position.

Also, in the example shown in FIG. 21, let us say that a starting point of a dragging operation is provided by bringing a finger or the like into contact with the region B at the upper side, and then a dragging operation is performed in the downward direction with the finger still in contact.

In this case, all four boundary symbols exist in the direction of the dragging operation from the starting point of the dragging operation, and three boundary symbol intervals between the boundary symbols exist. Accordingly, in FIG. 25, the dragging starting region is the region B, and the display positions of the boundary symbols are controlled in accordance with the amount-of-operation of the dragging operation as indicated in each line in the event that the dragging operation is downward.

In this case, the boundary symbol 103D is the head boundary symbol as shown in FIG. 25, and control is performed such that the display positions of the boundary symbols are changed in the downward direction which is the direction opposite to the direction indicated by the arrow in FIG. 21.

The display position of the head boundary symbol 103D is made to be a position in the user interface region 101 indicated by value yy1, yy2, . . . . The intervals of the boundary symbols are the controlled by the values indicated by the symbol interval 1, symbol interval 2, and symbol interval 3.

In this case, the intervals of each (1) between the boundary symbols 103D and 103C, (2) between the boundary symbols 103C and 103B, and (3) between the boundary symbols 103B and 103A, are controlled so as to be uniform.

As can be understood from the information of the symbol interval 1, symbol interval 2, and symbol interval 3, in FIG. 25, in this case as well, the intervals between the boundary symbols gradually become narrower as the amount-of-operation of the dragging operation becomes greater.

Accordingly, in this case, the boundary symbols have the intervals therebetween maintained in a uniform manner and gradually move to the lower edge side of the user interface region 101, and finally the intervals become 0 (zero) and the four boundary symbols are displayed overlaid on the same position.

Also, in the example shown in FIG. 21, let us say that a starting point of a dragging operation is provided by bringing a finger or the like into contact with the region C at the lower side, and then a dragging operation is performed in the upward direction with the finger still in contact.

In this case, all four boundary symbols exist in the direction of the dragging operation from the starting point of the dragging operation, and three boundary symbol intervals between the boundary symbols exist. Accordingly, in FIG. 25, the dragging starting region is the region C, and the display positions of the boundary symbols are controlled in accordance with the amount-of-operation of the dragging operation as indicated in each line in the event that the dragging operation is upward.

In this case, the boundary symbol 103A is the head boundary symbol as shown in FIG. 25, and control is performed such that the display positions of the boundary symbols are changed in the upward direction in FIG. 21.

The display position of the head boundary symbol 103A is made to be a position in the user interface region 101 indicated by value y1, y2, . . . . The intervals of the boundary symbols are the controlled by the values indicated by the symbol interval 1, symbol interval 2, and symbol interval 3.

In this case, the intervals of each (1) between the boundary symbols 103D and 103C, (2) between the boundary symbols 103C and 103B, and (3) between the boundary symbols 103B and 103A, are controlled so as to be uniform.

As can be understood from the information of the symbol interval 1, symbol interval 2, and symbol interval 3, in FIG. 25, in this case as well, the intervals between the boundary symbols gradually become narrower as the amount-of-operation of the dragging operation becomes greater.

Accordingly, in this case, the boundary symbols have the intervals therebetween maintained in a uniform manner and gradually move to the upper edge side of the user interface region 101, and finally the intervals become 0 (zero) and the four boundary symbols are displayed overlaid on the same position.

Also, in the example shown in FIG. 21, let us say that a starting point of a dragging operation is provided by bringing a finger or the like into contact with the region D at the upper side, and then a dragging operation is performed in the downward direction with the finger still in contact.

In this case, three boundary symbols exist in the direction of the dragging operation from the starting point of the dragging operation, and two between boundary symbols exist between the boundary symbols. In this case, in FIG. 26, the dragging starting region is the region D, and the display positions of the boundary symbols are controlled in accordance with the amount-of-operation of the dragging operation as indicated in each line in the event that the dragging operation is downward.

In this case, the boundary symbol 103D is the head boundary symbol as shown in FIG. 26, and control is performed such that the display positions of the boundary symbols are changed in the downward direction in FIG. 21.

The display position of the head boundary symbol 103D is made to be a position in the user interface region 101 indicated by value yy1, yy2, . . . . The intervals of the boundary symbols are the controlled by the values indicated by the symbol interval 1, symbol interval 2, and symbol interval 3.

In this case, the intervals of (1) between the boundary symbols 103C and 103D and (2) between the boundary symbols 103B and 103C, are controlled so as to be uniform. However, the interval (3) between the boundary symbols 103A and 103B is controlled so as to be greater than the intervals of (1) between the boundary symbols 103C and 103D and (2) between the boundary symbols 103B and 103C.

As can be understood from the information of the symbol interval 1, symbol interval 2, and symbol interval 3, in FIG. 26, in this case as well, the intervals between the boundary symbols gradually become narrower as the amount-of-operation of the dragging operation becomes greater.

Accordingly, in this case, the intervals of the two between boundary symbols, which are between the boundary symbols situated in the direction of the dragging operation as seen from the starting point, are uniform, and the interval of the other between boundary symbol is longer than the interval of the two between boundary symbols.

The boundary symbols gradually move to the lower edge side of the user interface region 101, and finally the intervals become 0 (zero) and the four boundary symbols are displayed overlaid on the same position.

Also, in the example shown in FIG. 21, let us say that a starting point of a dragging operation is provided by bringing a finger or the like into contact with the region E at the lower side, and then a dragging operation is performed in the upward direction with the finger still in contact.

In this case, three boundary symbols exist in the direction of the dragging operation from the starting point of the dragging operation, and two between boundary symbols exist between the boundary symbols. In this case, in FIG. 26, the dragging starting region is the region E, and the display positions of the boundary symbols are controlled in accordance with the amount-of-operation of the dragging operation as indicated in each line in the event that the dragging operation is upward.

In this case, the boundary symbol 103A is the head boundary symbol as shown in FIG. 26, and control is performed such that the display positions of the boundary symbols are changed in the upward direction in FIG. 21.

The display position of the head boundary symbol 103A is made to be a position in the user interface region 101 indicated by value y1, y2, . . . . The intervals of the boundary symbols are the controlled by the values indicated by the symbol interval 1, symbol interval 2, and symbol interval 3.

In this case, the intervals of (1) between the boundary symbols 103A and 103B and (2) between the boundary symbols 103B and 103C, are controlled so as to be uniform. However, the interval (3) between the boundary symbols 103C and 103D is controlled so as to be greater than the intervals of (1) between the boundary symbols 103A and 103B and (2) between the boundary symbols 103B and 103C.

As can be understood from the information of the symbol interval 1, symbol interval 2, and symbol interval 3, in FIG. 26, in this case as well, the intervals between the boundary symbols gradually become narrower as the amount-of-operation of the dragging operation becomes greater.

Accordingly, in this case, the intervals of the two between boundary symbols, which are between the boundary symbols situated in the direction of the dragging operation as seen from the starting point, are uniform, and the interval of the other between boundary symbol is longer than the interval of the two between boundary symbols.

The boundary symbols gradually move to the upper edge side of the user interface region 101, and finally the intervals become 0 (zero) and the four boundary symbols are displayed overlaid on the same position.

Thus, the information processing device 100 according to the present embodiment controls the display positions of the boundary symbols based on the position of the starting point of the dragging operation in the user interface region 101, the direction of the dragging operation as to the starting point, and the amount-of-operation of the dragging operation.

In this case, the display mode of boundary symbols in the user interface region 101 is changed in according to the dragging operations. Accordingly, the display of the user interface region 101 can be made to change in a mode matching the stretching and shrinking of rubber.

As described above as well, the display of the user interface region 101 can be changed in a mode corresponding to dragging operations by the user. Accordingly, the user can accurately tell how the information processing device 100 is recognizing the dragging operation he/she is performing.

The user can then correct the dragging operations which he/she is performed, based on the change in display mode of the boundary symbols in the user interface region 101, so as to perform intended display item scrolling.

Note that with the processing for adjusting the intervals between the boundary symbols described with reference to FIG. 25 and FIG. 26, the intervals between the boundary symbols were controlled following the first and second conditions below.

That is to say, as a first condition (principle), control is effected such that the closer intervals between boundary symbols are to the edge of the operating face of the input detection device 1 in the direction of the dragging operation determined in accordance with the current dragging position as to the starting point of the dragging operation, the narrower the intervals are.

However, as a second condition, control is affected such that the intervals between boundary symbols situated in the direction of the dragging operation from the starting point of the dragging operation are uniform at the state before the dragging operation is started.

Due to these controls, the user can clearly visually comprehend how the dragging operations he/she is performing are being recognized at the information processing device, by the display mode of the boundary symbols in the user interface region 101 according to user dragging operations.

Also, the display mode of the boundary symbols in the user interface region 101 can be changed as if rubber were stretching and shrinking, which is advantageous to the user performing operations in that the state of operations he/she is performing can be sensuously understood.

Note that the processing for adjusting the intervals between the boundary symbols described with reference to FIG. 25 and FIG. 26 is but an example, and that various other methods may be used as well.

For example, how the ratio of intervals between the boundary symbols will be is decided based on (a) position of the starting point of the dragging operation in the user interface region 101 and (b) direction of dragging operation as to starting point.

The unit widths of intervals between the boundary symbols are changed based on (c) amount-of-operation of the dragging operation, whereby the intervals between the boundary symbols can be suitably controlled. In this case, a detailed correlation table such as shown in FIG. 25 and FIG. 26 is unnecessary.

Also, control can be performed as a matter of course regarding the interval between the upper edge portion of the display screen 5G and a boundary symbol, and the interval between the lower edge portion of the display screen 5G and a boundary symbol, in the same way as described with reference to FIG. 2 through FIG. 5.

That is to say, the display position of the head boundary symbol in the operating direction can be gradually shifted from the initial display position by an amount corresponding to the amount-of-operation of the dragging operation by the user.

Also, a method may be used wherein the intervals between the boundary symbols are determined based on a predetermined function.

The main point is that it is sufficient for the display positions of the boundary symbols to be controlled based on (a) position of the starting point of the dragging operation in the user interface region 101, (b) direction of dragging operation as to starting point, and (c) amount-of-operation of the dragging operation, for example.

In this case, it is sufficient for the display mode of the boundary symbols in the user interface region 101 to be controlled in correlation with dragging operations by the user, following a predetermined physical model such as stretching and shrinking of rubber, stretching and shrinking of a spring, or the like, for example.

Note that the example described with reference to FIG. 21 through FIG. 26 is an example of a case in which a dragging operation has been performed, but the display mode of the boundary symbols can be changed in the same way with a case of having performed a flicking operation.

Figure 27:
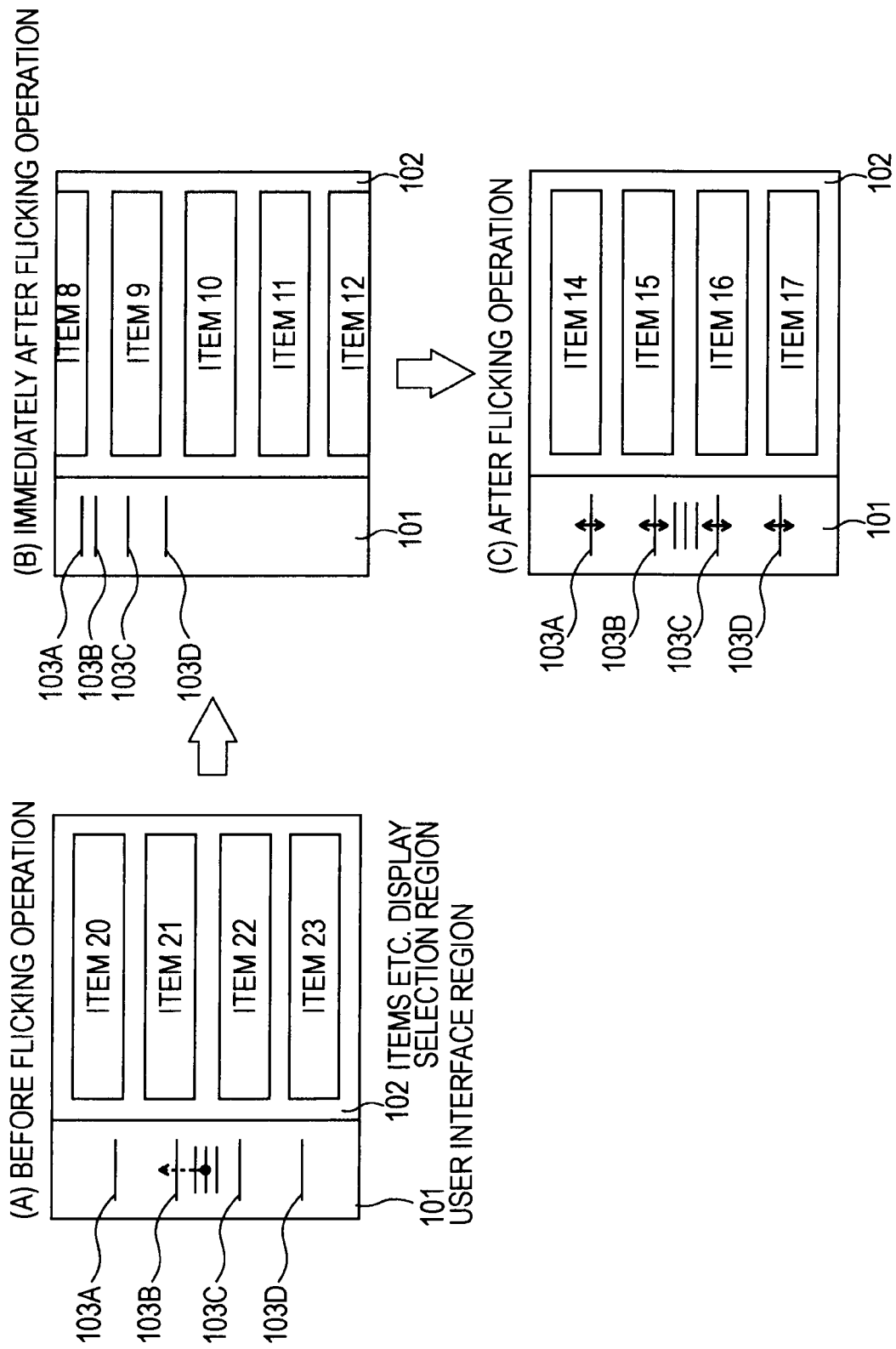
FIG. 27 is a diagram for describing another example of scrolling display of display operations displayed in the item etc. display selection region 102 in the case of having performed a flicking operation.

FIG. 27 is a diagram for describing scrolling display of display items displayed in the item etc. display selection region 102 in the case of having performed a flicking operation as to the operating face of the input detection device 1 in the user interface region 101.

As shown in FIG. 27(A), we will say that the boundary symbols and the like are displayed at their positions in the initial state before a dragging operation or flicking operation is performed, in the user interface region 101. Also, four display items from item 20 through item 23 are displayed in the item etc. display selection region 102, in a state capable of being scrolled both up and down.

We will now say that a flicking operation has been performed upwards (in the direction toward the upper edge) of the display screen 5G, as indicated by the dotted arrow from the lower side portion of the user interface region 101 in FIG. 27.

In this case, as shown in FIG. 27(B), immediately after a flicking operation has been performed, the display mode of the boundary symbols within the user interface region 101 is changed in accordance with the starting position of the flicking operation and the operating direction and amount-of-operation. At the same time, as shown in FIG. 27(B), the display items in the item etc. display selection region 102 are scrolled in accordance with the direction of operation and amount-of-operation of the flicking operation.

For example, as shown in FIG. 27(B), the intervals between the boundary symbols gradually become wider in the order of between the boundary symbols 103A and 103B→between the boundary symbols 103B and 103C→between the boundary symbols 103C and 103D.

That is to say, the closer to the edge portion of the display screen 5G in the direction of the flicking operation, the narrower between the boundary symbols is. Accordingly, the user can tell in which direction the flicking operation has been made in a sure manner, and can accurately comprehend the degree of amount-of-operation by the display mode of the boundary symbols in the user interface region.

Now, as described above, the amount of time of the contact state as to the operating face of the input detection device 1 is extremely short. Accordingly, in the case of the flicking operation, the amount-of-operation may be a predetermined amount.

And as described above, the contact state as to the operating face of the input detection device 1 is extremely short. Accordingly, after performing the display such as shown in FIG. 27(B) in accordance with the flicking operation, the display state of the boundary symbols in the user interface region 101 is speedily returned to the initial state, and also scrolling of the item etc. display selection region 102 is stopped.

That is to say, after changing the display state as shown in FIG. 27(B), the display positions of the boundary symbols in the user interface region 101 are returned to the positions of the initial state as shown in FIG. 27(C), and the boundary symbols are made to vibrate vertically.

The processing for causing the boundary symbols to vibrate is performed in the same way as the case described with reference to FIG. 17 and FIG. 18.

Also, after changing the display as shown in FIG. 27(B), the scrolling of the display items in the item etc. display selection region 102 is stopped as shown in FIG. 27(C). In this case, after executing scrolling of the display items by an amount corresponding to the flicking operation, the display item at the upper edge of the item etc. display selection region 102 of which the entirety is displayed is taken as the head display item, so that as shown in FIG. 27(C), four display items are displayed.

Thus, the intervals between the boundary symbols can be changed so as to be difference in accordance with the operating direction and amount-of-operation of the flicking operation even in a case wherein a flicking operation is performed instead of a dragging operation, thereby notifying the user of the contents of the operation. At the same time, the display items in the item etc. display selection region 102 can be performed in accordance with the direction of operation and amount-of-operation of the flicking operation.

[Application of the Information Processing Device of the Present Invention to an Imaging Apparatus]

Next, description will be made of an example of a case in which the information processing device according to the present invention is applied to a video camera (imaging apparatus).

Figure 28:
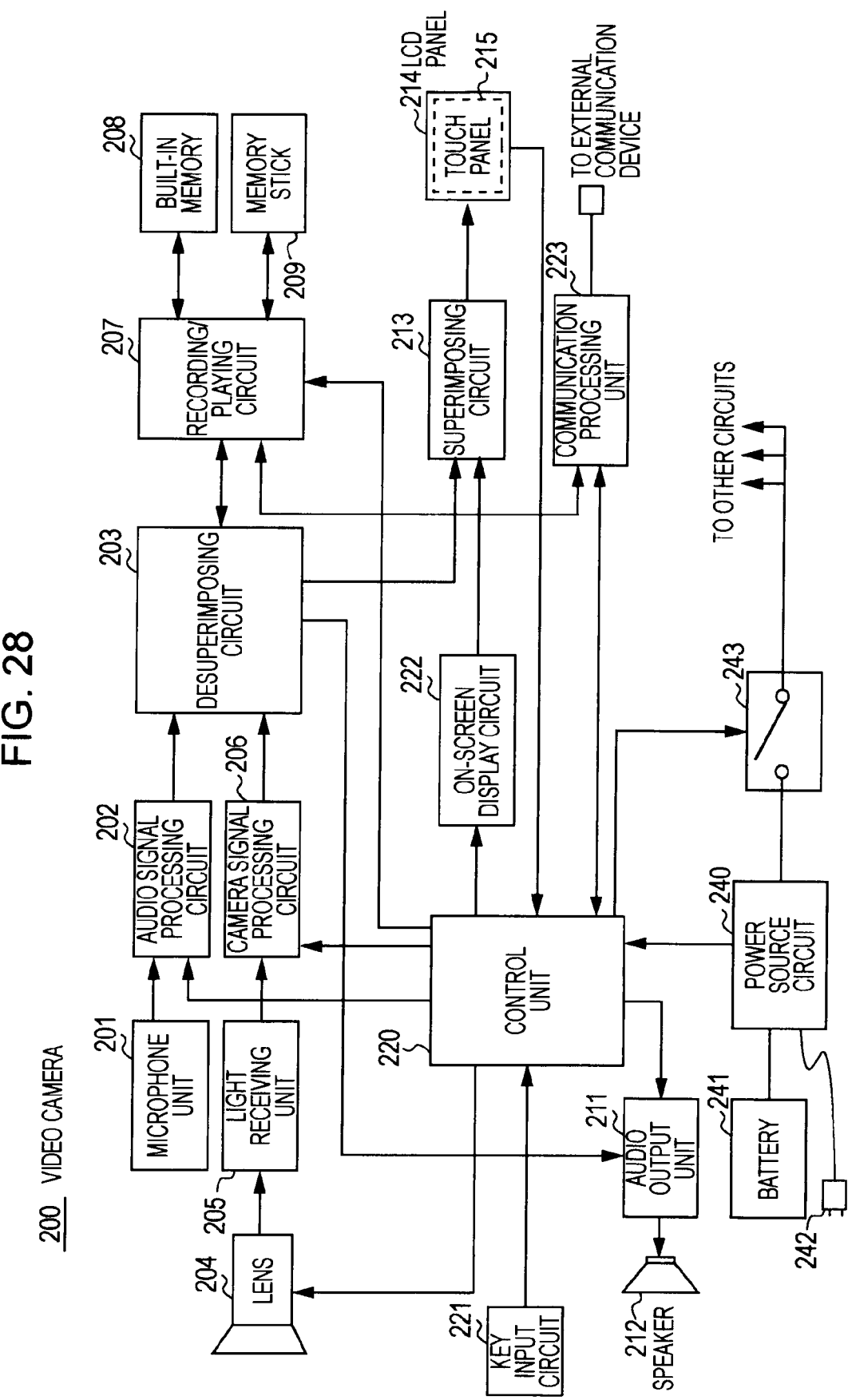
FIG. 28 is a block diagram for describing a configuration example of a video camera 200 to which the information processing device according to the present invention has been applied.

FIG. 28 is a block diagram for describing a configuration example of a video camera 200 to which information processing device according to the present invention has been applied.

A key input circuit 221 has various types of operating keys, such as a shooting start key, shooting stop key, standby key, play key, play stop key, fast forward key, fast rewind key, and so forth, which accept input operations from the user and supply these to a control unit 220.

The control unit 220 is a microcomputer configured of a CPU, ROM, RAM, non-volatile memory, and the like, connected via a CPU bus, though not shown, and controls the various parts by supplying control signals to the various parts.

Accordingly, the control unit 220 controls the various parts in accordance with instruction input from the user accepted by way of the key input circuit 221, and can execute processing corresponding to the user instructions at the video camera 200.

Upon accepting an instruction information for starting shooting by way of the key input circuit 221, the control unit 220 controls the various parts to start shooting processing.

In this case here, a microphone unit 201 collects surrounding audio and converts into electric signals, which is supplied to an audio signal processing circuit 202. The audio signal processing circuit 202 subjects the supplied audio signals to various types of audio signal processing such as amplification processing, noise reduction processing, A/D (Analog/Digital) conversion processing, and so forth, and supplies the digital audio signals following processing to a desuperimposing circuit 203.

On the other hand, a lens 204 has exposure and focus controlled by way of the control unit 220, so as to take in images of subjects, such that this image is imaged on an imaging face of an imaging device which a light receiving unit 205 situated downstream has.

The light receiving unit 205 has an imaging device such as a CCD (Charge Coupled Device) or CMOS (Complementary Metal Oxide Semiconductor) image sensor, for example. The light receiving unit 205 then converts the images imaged on the imaging face of the imaging device of itself, and supplies these to a camera signal processing circuit 206.

The camera signal processing circuit 206 converts the supplied video signals into digital signals, performs various types of camera signal processing such as detection processing, white balance adjustment, synchronization processing, gamma correction, and so forth, and supplies the digital video signals following processing to the desuperimposing circuit 203.

The desuperimposing circuit 203 performs data compression of the digital audio signals and digital video signals supplied thereto, performs multiplexing processing, forms recording data, and supplies the recording data to a recording/playing circuit 207.

The recording/playing circuit 207 stores the recording data from the desuperimposing circuit 203 in internal memory 208 or a memory stick (registered trademark) 209. The memory stick 209 here is a so-called memory card manufactured by Sony Corporation. Also, while the video camera 200 is arranged to use the memory stick 209, arrangements may be made to user various other memory cards.

Also, in the event that video and audio are being recorded as described above, video data before compression is output from the desuperimposing circuit 203 to a superimposing circuit 213. Display information to be superimposed on the video to be displayed is also supplied to the superimposing circuit 213 from an on-screen display circuit 222.

That is to say, the on-screen display circuit 222 forms various types of display information to be superimposed on video to be displayed on the display screen of a later-described LCD panel 214 in accordance with control of the control unit 220, which is supplied to the superimposing circuit 213.

Display information to be formed at the on-screen display circuit 222 forms various types of guidance messages, icons, audio volume adjusting bar, various types of adjusting bars regarding to video, and so forth.

Besides this, the on-screen display circuit 222 forms and supplies to the superimposing circuit 213, for example, boundary symbols and stop guide symbols, display items (data objects), and so forth, to be displayed in the user interface region 101.

The superimposing circuit 213 superimposes the display information from the on-screen display circuit 222 onto the video signals from the desuperimposing circuit 203, converts this into analog signals, and supplies to the LCD panel 214.

Accordingly, video wherein video formed at the on-screen display circuit 222 is superimposed on the video captured by the lens 204 can be displayed on the display screen of the LCD panel 214 and provided to the user.

Note that the on-screen display circuit 222 forms display information to be superimposed only when necessary in accordance with control of the control unit 220, and does not always form display information to be superimposed. In the event that the on-screen display circuit 222 is not forming display information, only the video captured by the lens 204 is displayed at the LCD panel 214.

Also, in the event of recording video and audio as described above, audio data before data compression is supplied from the desuperimposing circuit 203 and supplied to an audio output unit 211. The audio output unit 211 converts the supplied audio data into analog audio signals, performs processing such as amplification in accordance with control of the control unit 220, and supplies the audio signals following processing to a speaker 212.

Accordingly, audio collected by the microphone unit 201 can be output via the speaker 212 and provided to the user.

Next, a case of applying recorded data (that where video data and audio data have been multiplexed) recorded in internal memory 208 or the memory stick 209 will be described.

Upon accepting instruction input to start playing or recorded data recorded in memory by way of the key input circuit 221, the control unit 220 controls the various parts to start playing processing of the recorded data.

In this case, the recording/playing circuit 207 reads out he recorded data regarding which an instruction has been made to play, from the internal memory 208 or memory stick 209 where it is recorded, and supplies the recorded data that has been read out to the desuperimposing circuit 203.

The desuperimposing circuit 203 divides the recorded data from the recording/playing circuit 207 into the audio data and video data multiplexed therein, and performs decompression (data decompression) to restore to the audio data and video data before data compression.

The desuperimposing circuit 203 then supplies the restored video data to the LCD panel 214 by way of the superimposing circuit 213. Thus, video corresponding to the video data recorded it the memory can be displayed on the display screen of the LCD panel 214.

Note that in this case as well, the control unit 220 can control the on-screen display circuit 222 as necessary to display various types of display information superimposed on the video displayed on the display screen of the LCD panel 214.

On the other hand, the desuperimposing circuit 203 supplies the restored audio data to the audio output unit 211. Accordingly, audio corresponding to the audio data recorded in the memory can be output from the speaker 212.

Note that with the video camera 200, a communication processing unit 223 is an external interface enabling connection with external devices under control of the control unit 220.

The communication processing unit here forms transmission data out of the recorded data recorded in the internal memory 208 or memory stick 209, and sends this to external devices.

Also, the communication processing unit 223 can accept transmitted data from external devices and convert into signals of a format usable at its own device, supply this to the recording/playing circuit 207, and record in its own memory.

A power source circuit 240, battery 241, power plug 242, and switch circuit 243 make up a power source system, so as to constantly supply power source to the control unit 220.

Upon power being turned on to the video camera 200, the control unit 220 turns the switch circuit 243 on so as to supply power to the various parts of the video camera 200 such that the various parts can be driven.

Also, in the event of the power being turned off to the video camera 200 of which the power is on, the control unit 220 turns the switch circuit 243 off so as to allow supply of power to be stopped to the various parts of the video camera 200.

With the video camera 200 according to the embodiment as well, the display screen of the LCD panel 214 has a touch panel 215 applied by adhesions, with the operating face of the touch panel 215 being formed on the entire face of the display screen.

With the video camera 200, the information processing device 100 according to the present invention is realized by the control unit 220, the on-screen display circuit 222, the superimposing circuit 213, the LCD panel 214, and the touch panel 215.

That is to say, in FIG. 28, the touch panel 215 realizes the input detection device 1, and also the control unit 220 realizes the functions of each of the user interface control unit 2, data object control unit 3, coefficient and data storage unit 6, and central control unit 7.

Also, the on-screen display circuit 222 and the superimposing circuit 213 realize the display memory unit 4, and the LCD panel 214 realizes the display device 5.

Accordingly, with the video camera 200, in a case of selecting and executing an intended function various functions which can be executed, the display mode can be changed in accordance with dragging operations of the user, in the same way as with the above-described information processing device 100.

That is to say, the functions of the control unit 220, the on-screen display circuit 222, and the superimposing circuit 213, are used to provide the user interface region 101 and item etc. display selection region 102 on the display screen of the LCD panel 214, as shown in FIG. 2 through FIG. 7 and so forth.

Dragging operations and flicking operations are then performed on the operating face of the touch panel 215 in the user interface region 101. Accordingly, the display mode of boundary symbols in the user interface region 101 can be changed, and the display items in the item etc. display selection region 102 can be scrolled.

[Advantages of Embodiments]

According to the information processing device of the above-described embodiments, the degree of scrolling acceleration of display items corresponding to a tracing operation is expressed using a physical stretching/shrinking expression, whereby the user amount-of-operation can be intuitively comprehended and changed. Also, user handiness has improved due to enabling tracing operations again from anywhere in the user interface region.

Also, comprehending the scrolling acceleration as the difference from the starting point of the tracing operation rather than the current tracing position has enabled the display mode of boundary symbols in the user interface region to be stretching/shrinking expression familiar to use, whereby the user amount-of-operation can be intuitively comprehended and changed.

Also, due to the user himself/herself being able to intuitively comprehend the amount-of-operation of his/her tracing operations, the user can easily change to a scrolling speed comfortable for himself/herself based on the recognized tracing amount-of-operation.

Also, due to the user himself/herself being able to easily change the scrolling speed, switching between cases wherein slowly confirming the display items (data objects) is desired and cases wherein speedily moving is desired, is facilitated.

Also, by making a display at the time of ending the tracing operation such that corresponds to stretching and shrinking action of rubber, for the boundary symbols in the user interface region 101, ending of the tracing operation can be intuitively recognized.

[Method and Program of the Present Invention]

As can be clearly seen from the above-described embodiments, a method and program according to the present invention can be realized as a method and program described with reference to the flowcharts shown in FIG. 8, FIG. 14, FIG. 18, and FIG. 20.

That is to say, the method described with reference to FIG. 8, FIG. 14, FIG. 18, and FIG. 20 is the method according to the present invention.

Also, the program for executing the processing described with reference to FIG. 8, FIG. 14, FIG. 18, and FIG. 20 is the program according to the present invention.

Accordingly, the information processing device according to the present invention can be realized by realizing the program according to the present invention and implementing in various types of electronic devices having a display device such as an LCD or the like and an input detection device such as a touch panel or the like.

[Other]

Note that with the information processing device 100 in the above-described embodiments, the functions of the display device are realized by the display device 5, and the functions of instruction position detecting means are realized by the input, detection device 1. Also, the functions of detecting means are realized by the user interface control unit 2.

Also, with the information processing device 100 in the above-described embodiments, the functions of operating symbol display control means are realized by the user interface control unit 2 and the display memory unit 4, and the functions of scroll control means are realized by the data object control unit 3 and the display memory unit 4.

Also, with the video camera 200 in the above-described embodiments, the functions of the display device are realized by the LCD panel 214, and the functions of instruction position detecting means are realized by the touch panel 215. Also, the functions of detecting means are realized by the control unit 220.

Also, with the video camera 200 in the above-described embodiments, the functions of operating symbol display control means and scroll control means are realized by the control unit 220 and the on-screen display circuit 222 and the superimposing circuit 213.

Also, while a case of application to a video camera has been described as an example of applying the information processing device according to the present invention, this is not restricted to this. For example, application can be made to various types of electronic devices having a display device such as an LCD or the like and an input detection device such as a touch panel or the like, such as digital still cameras, gaming devices, portable information terminals called PDAs (Personal Digital Assistant), and so forth.

Also, the intervals of the boundary symbols have been described as being uniform in the initial state in the above-described embodiments, this is not restricted to this. The intervals between the boundary symbols in the initial state, the number of boundary symbols, and so forth, may be made to be that which is suitable.

Also, the boundary symbols are not restricted to line segments. The user interface region may be divided into multiple regions with pictures or shapes displayed in each region, or filled in with different colors.

In this case, the boundary portions of the regions are the display portions of the boundary symbols described above. Also, in the same way as with the case of the boundary symbols displayed above, control is effected so as to change the boundary symbols of the regions. Accordingly, a display like the stretching and shrinking of rubber can be expressed in the user interface region, as with the case of the above-described embodiments.

In this case, the pictures or shapes displayed are changed, or the ranges of displayed color are changed, in accordance with the width of the regions into which the user interface region has been divided being changed.

In the event of changing the pictures and shapes displayed in each region, the expression is one of stretching and shrinking the displayed pictures and shapes, and in the case of changing the range of color displayed, the expression is one of changing the range filled in with the same color in accordance with the width of the region being changed.

Also, in the case of the information processing device according to the embodiments described above, the user interface region has been described as being provided to the left side of the display screen as viewed facing the display screen, as shown in FIG. 2 and so forth, but is not restricted to this. This may be provided to the right side of the display screen as viewed facing the display screen.

Also, the user interface region may be provided to the upper edge side or lower edge side of the display screen, with tracing operations being performed in the left and right directions of the display screen.

That is to say, the user interface region and item etc. display selection region can be provided to the display screen at a suitable position in a suitable size.

Also, with the above-described embodiments, the input detection device has been described as being a so-called contact type pressure-sensitive or electrostatic touch panel, but is not restricted to this. For example, the present invention can be applied to a case of using a non-contact type panel capable of receiving instructions from the user by change in the electrostatic capacity due to the user bring a finger close thereto.

Also, the present invention can be applied to a case of using a non-contact type panel capable of receiving instructions from the user by luminance on the panel due to the user bring a finger close thereto.

REFERENCE SIGNS LIST 1 input detection device
2 user interface control unit
3 data object control unit
4 display memory unit
5 display device
6 coefficient and data storage unit
7 central control unit

The invention claimed is:

1. An information processing device comprising:
a display device;
instruction position detecting circuitry including an operating face provided on a display screen of said display device configured to accept an instruction operation from a user, and to detect and output coordinate information indicating an instruction position corresponding to said instruction operation;
detecting circuitry configured to detect, when a tracing operation is performed on said operating face of said instruction position detecting circuitry, an amount-of-operation and an operation direction including a starting position of said tracing operation, based on said coordinate information from said instruction position detecting circuitry; and
operating symbol display control circuitry configured to display operating symbols at predetermined positions on the display screen of said display device, and to change a display mode of said operating symbols based on said amount-of-operation and said operation direction of said tracing operation such that said tracing operation of the user is recognizable,
wherein the changing of the display mode of said operating symbols corresponds to changing the predetermined positions of said operating symbols in one direction on the display screen of said display device with respect to one another in accordance with said amount-of-operation and said operation direction of said tracing operation, and
wherein the changing the predetermined positions of said operating symbols includes
changing respective positions of each of the operating symbols in the one direction on the display screen based on said amount-of-operation and said operation direction of said tracing operation, and
changing interval distances between said operating symbols in the one direction based on said amount-of-operation and said operation direction of said tracing operation.

2. The information processing device according to claim 1, wherein, when said operating symbols are displayed, said operating symbol display control circuitry changes the interval distances between adjacent pairs of said operating symbols based on a detection output from said detecting circuitry.

3. The information processing device according to claim 1, wherein, when said operating symbols are displayed, said operating symbol display control circuitry changes the display mode such that said displayed operating symbols are one of stretched or shrunk based on a detection output from said detecting circuitry.

4. The information processing device according to claim 2, wherein, when said tracing operation is performed, said operating symbol display control circuitry makes the interval distances narrower between adjacent operating symbols that are closer to an edge portion of said operating face of said instruction position detecting circuitry in a direction of said tracing operation than the interval distances between adjacent operating symbols that are further from the edge portion of said operating face in the direction of said tracing operation, the direction of said tracing operation being determined in accordance with said instruction position of said tracing operation as to the starting position of said tracing operation.

5. The information processing device according to claim 4, wherein, before said tracing operation is started, said operating symbol display control circuitry makes the the interval distances between said operating symbols equal.

6. The information processing device according to claim 1, further comprising scroll control circuitry configured to control display of display items to be scrolled on the display screen of said display device, to obtain direction and acceleration of scrolling when said display items are scrolled based on a detection output from said detecting circuitry, and to scroll said display items in accordance with said direction and acceleration of scrolling.

7. An information processing method comprising:
accepting an instruction operation from a user, using instruction position detecting circuitry including an operating face provided on a display screen of a display device, to detect and output coordinate information indicating an instruction position corresponding to said instruction operation;
detecting, using detecting circuitry, when a tracing operation is accepted from the user in said accepting said instruction operation, an amount-of-operation and an operation direction including a starting position of said tracing operation based on said coordinate information from said instruction position detecting circuitry;
displaying operating symbols at predetermined positions on the display screen of said display device; and
changing a display mode of said operating symbols based on said amount-of-operation and said operation direction of said tracing operation such that said tracing operation of the user is recognizable,
wherein the changing of the display mode of said operating symbols corresponds to changing the predetermined positions of said operating symbols along a bidirectional ray on the display screen of said display device with respect to one another in accordance with said amount-of-operation and said operation direction of said tracing operation, and
wherein the changing the predetermined positions of said operating symbols includes changing respective positions of each of the operating symbols in the one direction on the display screen based on said amount-of-operation and said operation direction of said tracing operation, and changing interval distances between said operating symbols in the one direction based on said amount-of-operation and said operation direction of said tracing operation.

8. A non-transitory computer-readable storage medium storing computer-readable instructions that, when executed by a computer, cause the computer to execute a method comprising:

accepting an instruction operation from a user, using instruction position detecting circuitry including an operating face provided on a display screen of a display device, to detect and output coordinate information indicating an instruction position corresponding to said instruction operation;

detecting, using detecting circuitry, when a tracing operation is accepted from the user in said accepting said instruction operation, an amount-of-operation and an operation direction including a starting position of said tracing operation based on said coordinate information from said instruction position detecting circuitry;

displaying operating symbols at predetermined positions on the display screen of said display device; and changing a display mode of said operating symbols based on said amount-of-operation and said operation direction of said tracing operation such that said tracing operation of the user is recognizable, wherein the changing of the display mode of said operating symbols corresponds to changing the predetermined positions of said operating symbols in parallel with respect to one another on the display screen of said display device in accordance with said amount-of-operation and said operation direction of said tracing operation, and wherein the changing the predetermined positions of said operating symbols includes changing respective positions of each of the operating symbols in the one direction on the display screen based on said amount-of-operation and said operation direction of said tracing operation, and changing interval distances between said operating symbols in the one direction based on said amount-of-operation and said operation direction of said tracing operation.

9. The information processing device according to claim 1, wherein said detection circuitry is configured to calculate a difference between the starting position of said tracing operation and an end position of said tracing operation and to calculate a ratio between the difference and a maximum possible traceable operation.

10. The information processing device according to claim 9, wherein when the difference between the starting position of said tracing operation and the end position of said tracing operation increases, said operating symbol display control circuitry makes the interval distances narrower between adjacent operating symbols that are closer to an edge portion of said operating face in a direction of said tracing operation than the interval distances between adjacent operating symbols that are further from the edge portion of said operating face in the direction of said tracing operation.

11. The information processing device according to claim 9, wherein when the difference between the starting position of said tracing operation and the end position of said tracing operation increases, said operating symbol display control circuitry makes the interval distances larger between adjacent operating symbols that are further from an edge portion of said operating face in a direction of said tracing operation than the interval distances between adjacent operating symbols that are closer to the edge portion of said operating face in the direction of said tracing operation.

12. The information processing device according to claim 9, wherein when the difference between the starting position of said tracing operation and the end position of said tracing operation increases, an acceleration of scrolling display items on the display screen increases.

13. The information processing device according to claim 9, wherein the interval distances are narrower between adjacent operating symbols that are between the starting position of said tracing operation and a first edge portion of said operating face in a direction of said tracing operation than the interval distances between adjacent operating symbols that are between the starting position of said tracing operation and a second edge portion of said operating face in an opposite direction to said tracing operation.

14. The information processing device according to claim 9, wherein the interval distances are larger between adjacent operating symbols that are between the starting position of said tracing operation and a first edge portion of said operating face in a direction opposite to said tracing operation than the interval distances between adjacent operating symbols that are between the starting position of said tracing operation and a second edge portion of said operating face in a direction of said tracing operation.

15. The information processing device according to claim 1, wherein a total number of said operating symbols remains the same during said tracing operation from a start position to one of an end position or intermediate position thereof.

* * * * *